US006973477B1

(12) United States Patent
Martino

(10) Patent No.: US 6,973,477 B1
(45) **Date of Patent: *Dec. 6, 2005**

(54) SYSTEM FOR SECURELY COMMUNICATING AMONGST CLIENT COMPUTER SYSTEMS

(75) Inventor: Rocco L. Martino, Villanova, PA (US)

(73) Assignee: Cyberfone Technologies, Inc.

( * ) Notice: Subject to any disclaimer, the term of this patent is extended or adjusted under 35 U.S.C. 154(b) by 907 days.

This patent is subject to a terminal disclaimer.

(21) Appl. No.: 09/589,814

(22) Filed: Jun. 7, 2000

Related U.S. Application Data

(63) Continuation-in-part of application No. 09/390,798, filed on Sep. 7, 1999, now Pat. No. 6,574,314, which is a continuation of application No. 08/909,408, filed on Aug. 11, 1997, now Pat. No. 5,987,103, which is a continuation of application No. 08/446,546, filed on May 19, 1995, now Pat. No. 5,805,676.

(51) Int. Cl.[7] .................................. G06F 15/16

(52) U.S. Cl. .................................. 709/203; 707/102

(58) Field of Search .................................. 709/201, 203; 707/505–508, 102; 379/89–90, 93.13, 202; 235/379

(56) References Cited

U.S. PATENT DOCUMENTS 4,591,662 A 5/1986 Legros et al. ............. 179/2 DP (Continued)

FOREIGN PATENT DOCUMENTS

EP 0420461 A 4/1991

(Continued)

OTHER PUBLICATIONS

"Custom Data Entry Form System for Software Applications" *IBM Technical Disclosure Bulletin*, US, IBM Corp., New York, vol. 34, No. 11 (1992) pp. 384–385.

(Continued)

*Primary Examiner*—Bunjob Jaroenchonwanit
(74) *Attorney, Agent, or Firm*—Woodcock Washburn LLP

(57) ABSTRACT

A data transaction processing system in which transaction data is entered by the user in response to prompts in a template which is tailored to each user application. The template and entered data are accumulated into data transactions that are immediately transmitted upon completion to an external database server for processing and storage. The data transaction is received via standard protocols at the database server which, depending upon the application, stores the entire data transaction, explodes the data transaction to produce ancillary records which are then stored, and/or forwards the data transaction or some or all of the ancillary records to other database servers for updating other databases associated with those database servers. In response to requests from the transaction entry device, the database server may return data streams for use in completing the fields in the data transaction or in presenting a menu on the display which was read in from the database server or a remote phone mail system. The transaction entry device is integrated with a telephone and is accessed via a touch screen, an optional keyboard, a magnetic card reader, voice entry, a modem, and the like.

A plurality of such database servers under the control of broad operations system server (BOSS) software and a plurality of form-driven client computing devices are provided to create an open platform system for receiving and transmitting transaction data to or from the client devices, other applications and databases. Advantageously, a locator server computer serves to retrieve IP address numbers, PSTN numbers and other network identification information for use in identifying and locating, e.g., an originating user and a destination client device. A robust security and authentication scheme along with robust storage protects the transmission of sensitive or confidential data.

34 Claims, 23 Drawing Sheets

U.S. PATENT DOCUMENTS

| | | | | | |
|---|---|---|---|---|---|
| 4,598,171 | A | | 7/1986 | Hanscom et al. | 179/6.14 |
| 4,689,478 | A | | 8/1987 | Hale et al. | 235/380 |
| 4,776,016 | A | | 10/1988 | Hansen | 381/42 |
| 4,835,372 | A | | 5/1989 | Gombrich et al. | 235/375 |
| 4,851,999 | A | * | 7/1989 | Moriyama | 705/30 |
| 4,858,121 | A | | 8/1989 | Barber et al. | 364/406 |
| 4,860,342 | A | | 8/1989 | Danner | 379/96 |
| 4,972,462 | A | | 11/1990 | Shibata | 379/89 |
| 4,975,942 | A | * | 12/1990 | Zebryk | 379/144.01 |
| 4,984,155 | A | | 1/1991 | Geier et al. | 364/401 |
| 4,991,199 | A | * | 2/1991 | Parekh et al. | 379/93.01 |
| 5,008,927 | A | | 4/1991 | Weiss et al. | 379/98 |
| 5,157,717 | A | * | 10/1992 | Hitchcock | 379/93.19 |
| 5,189,632 | A | | 2/1993 | Paajanen et al. | 364/705.05 |
| 5,195,086 | A | | 3/1993 | Baumgartner et al. | 370/62 |
| 5,195,130 | A | | 3/1993 | Weiss et al. | 379/98 |
| 5,301,105 | A | * | 4/1994 | Cummings, Jr. | 705/2 |
| 5,325,592 | A | | 7/1994 | Linden et al. | 30/254 |
| 5,333,266 | A | | 7/1994 | Boaz et al. | 395/200 |
| 5,351,076 | A | | 9/1994 | Hata et al. | 348/14 |
| 5,365,577 | A | | 11/1994 | Davis et al. | 379/96 |
| 5,410,646 | A | | 4/1995 | Tondevold et al. | 395/149 |
| 5,416,831 | A | * | 5/1995 | Chewning et al. | 379/93.25 |
| 5,572,421 | A | | 11/1996 | Altman et al. | 395/203 |
| 5,805,676 | A | * | 9/1998 | Martino | 379/93.17 |
| 5,809,415 | A | | 9/1998 | Rossmann | 455/422 |
| 5,841,981 | A | | 11/1998 | Kondo | 395/200.53 |
| 5,884,323 | A | | 3/1999 | Hawkins et al. | 707/201 |
| 5,896,369 | A | | 4/1999 | Warsta et al. | 370/338 |
| 5,966,431 | A | | 10/1999 | Reiman et al. | 379/115 |
| 5,987,103 | A | * | 11/1999 | Martino | 379/93.17 |
| 6,044,382 | A | * | 3/2000 | Martino | 715/505 |
| 6,119,155 | A | | 9/2000 | Rossmann et al. | 709/219 |
| 6,243,373 | B1 | | 6/2001 | Turock | 370/352 |
| 6,405,037 | B1 | | 6/2002 | Rossmann | 455/426 |
| 6,430,409 | B1 | | 8/2002 | Rossmann | 455/422 |
| 6,466,783 | B2 | | 10/2002 | Dahm et al. | 455/414 |
| 6,473,609 | B1 | | 10/2002 | Schwartz et al. | 455/406 |
| 6,526,439 | B1 | | 2/2003 | Rossmann et al. | 709/219 |
| 6,574,314 | B1 | * | 6/2003 | Martino | 379/93.17 |
| 6,625,447 | B1 | | 9/2003 | Rossmann | 455/422 |
| 6,742,022 | B1 | | 5/2004 | King et al. | 709/219 |

FOREIGN PATENT DOCUMENTS

| | | |
|---|---|---|
| WO | WO 96/13814 | 5/1996 |
| WO | WO 01/37170 A2 | 5/2001 |

OTHER PUBLICATIONS

NOTE–Submission–HDML, W3C©, “Proposal for a Hand-held Device Markup Language”, May 5, 2004, *http://www.w3.org/TR/NOTE–Submission–HDML.html*, 5 pages.

PREFACE, May 5, 2004, *http://www.w3.org/TR/hdml20–3.html*, 2 pages,

4 User Agent Semantics, Chapter 4: User Agent Seminatics, May 5, 2004, *http://www.w3.org/TR/hdml20–7.html*2 pages.

* cited by examiner

SYSTEM FOR SECURELY COMMUNICATING AMONGST CLIENT COMPUTER SYSTEMS

CROSS-REFERENCE TO RELATED APPLICATIONS

"The present application is a continuation-in-part of U.S. patent application Ser. No. 09/390,798, filed Sept. 7, 1999, now U.S. Pat. No. 6,574,314, which is a continuation of U.S. patent application Ser. No. 08/909,408, filed Aug. 11, 1997, now U.S. Pat. No. 5,987,103, which is a continuation of U.S. patent application Ser. No. 08/446,546, filed May 19, 1995 now U.S. Pat. No. 5,805,676."

FIELD OF THE INVENTION

The present invention relates generally to client computer systems for use in connection with services such as providing healthcare, finance, desk-top applications, security, authentication, video mail, or note mail, or to any system utilized for the transmission of messages, combinations of messages, or processed information stored in or generated from any source, and more particularly, to secure data communications in such a system among client devices, server computers, services, databases and other system objects or components.

BACKGROUND OF THE INVENTION

"Point-of-entry systems have been developed which incorporate computer processor capabilities into conventional telephones. For example, a computer/telephone apparatus is described in U.S. Pat. Nos. 5,195,130, 5,008,927, and 4,991,199 that configures a telephone as a programmable microcomputer that is operated through the standard telephone 12-key keypad. A programmable gate array is reconfigured to accommodate various types of software that require different hardware configurations but without actually reconfiguring the hardware. The reconfiguration data is received from a network host computer and is used by the programmable microcomputer to emulate the hardware of any of a plurality of service bureaus that communicate with the network host computer. In this manner, the telephone/computer is configured to communicate data to/from any of a number of different service bureaus via conventional telephone lines."

However, telephone/computer systems of the type described in the aforementioned patents are typically quite complicated and expensive and are limited by the types of operating software which can be downloaded from the network host computer. Also, such telephone/computer systems are relatively slow since the microcomputer must be reconfigured before it will permit communication with the requested service bureau. Because of these characteristic features, such telephone/computer systems are typically used in public locations and are not efficient for creating point-of-entry transactions in typical commercial or private settings. A point-of-entry transaction entry system is desired which does not have such limitations and which is maximally or entirely independent of conventional operating system(s).

Elimination of many or all of the requirements of a conventional operating system, with its command interpreters, memory management functions, function schedulers, disk operation functions, and the like, to run application programs and the need to write and compile a number of individual application programs for each application implemented by the microprocessor of a data entry and/or transaction creation device would greatly decrease the cost of such a device. However, to date, this has not been possible because an operating system with the above-mentioned features is needed to run the application programs that control the data communications and together handle discrete parts of the computer system.

Various aspects of point-of-entry, transaction or "form-driven" computer systems are described in the following commonly assigned U.S. Patents (hereby incorporated by reference): U.S. Pat. No. 5,805,676, "Telephone/Transaction Entry Device and System for Entering Transaction Data into Databases," to Martino, issued Sep. 8, 1998, U.S. Pat. No. 5,987,103, "Telephone/Transaction Entry Device and System for Entering Transaction Data into Databases," to Martino, issued Nov. 16, 1999 and U.S. Pat. No. 6,044,382, "Data Transaction Assembly Server," to Martino, issued Mar. 28, 2000. The foregoing patents describe various aspects of such a system, such as the use of transaction application operating systems resident in client devices, whereby generally menus, forms, reports, messages and other like communications are transmitted among a plurality of databases, services, servers and client devices. Data displays for client devices may have touch screens and may lend to the display of tabular information such as forms, menus, reports, lists, etc. for requesting transactions to be performed in conjunction with the client device's transaction application operating system.

A data entry system is desired which does not have the inherent limitations of conventional point-of-entry systems such as the requirement of a standard operating system for communication with a remote service bureau or file server. A data entry and display device and associated system is desired which performs a minimal amount of processing at the data entry device so that the data entry device may be simple and inexpensive, thereby bringing the cost of such a device into a range suitable for most commercial and private uses. It is also preferable that such a data entry device provide a wide range of functionality without requiring a local operating system program and a plurality of applications programs for implementing each function. It is also preferable that such a system implement a security technique for robust transmission of data. It is still further preferable that such a system be capable of pushing transaction data to a user after locating the user after log on or other initiation of a session with the system. The present invention has been designed to meet these needs.

SUMMARY OF THE INVENTION

A client computer system is provided to/from which communications may be wired or wireless, via laser or other network transmission. Messages transmitted in the system can be data, menus, forms, tables, applications, audio, video, graphics or combinations thereof that may be utilized in providing services such as healthcare, finance, desk-top applications, security, authentication, video mail, or note mail, or to any system utilized for the transmission of messages, combinations of messages, or processed information stored in or generated from any source.

The system of the present invention addresses the above-mentioned needs in the art by providing a client computer system wherein a client device has a form-driven operating system. The form-driven operating system may be a transaction assembly (application) server (TAS) that guides the user to the desired template via menu selections, where the menus and templates are stored in flash memory as data streams and are called up by the TAS firmware when selected by the user. TAS firmware may also be implemented in software, software loaded into hardware, hardware or a combination of hardware and software for performing the functions of a form-driven operating system. Generally, the menus are treated as a special type of template or form. The templates stored in the flash memory may be updated at any time to handle particular applications by reading in a new data set that has been created off-line and downloaded via modem or direct connection to the flash memory of the transaction entry device. Alternatively, the data may be downloaded to an RS-232 input. The same connections may be used to provide an automatic read from a remote database or an automatic write to a remote database. New applications may be added simply by adding additional flash memory elements containing the necessary templates for the new application or by downloading the new templates to existing flash memory.

The client device and the associated system for storing transaction data in accordance with the invention is unique in that it separates the user from the database and provides a simple, user friendly way to enter transaction data without requiring a local operating system to run various application programs. Since all data is entered as data transactions determined by templates tailored to particular applications, the user applications may be generalized so that no unique user application programs need to be written when a new application is added. However, if code is needed, or if a multimedia element is to be included in a data transaction, it can be appended to a data transaction as an additional parameter stream in the stream of data forming the data transaction. Also, since the nature of the data in the respective fields of the templates for particular applications is known in advance, the interface to a database server to permit storage of the data transactions and their component parts in the appropriate databases in the appropriate formats for each database becomes trivial. Furthermore, various known security and authentication techniques may be applied to the system components of the present invention and to users of system client devices.

In a first embodiment, the invention includes a transaction entry device that permits the user to organize and control all aspects of his or her personal transactions as well as any transactions that may occur in an office setting. In its simplest terms, the transaction entry device formats input data into a data transaction having content that is dependent upon the type of application to which the associated data pertains. These data transactions are then transferred to a local or remote database server which "explodes" each data transaction into its component parts for updating all databases containing data to which the data in the component parts pertain. In this "transaction entry mode" the transaction entry device o e invention functions as a multi-purpose workstation. However, since the data transactions are created without the use of an operating system or application programs, the transaction entry device is quite simple and inexpensive and may be readily integrate with the customer's desktop telephone or portable telephone.

In the first described embodiment, the present invention combines computer technology and telephone technology to allow transaction data to be captured at the point of initiation of the transaction. The transaction entry device is integrated into a conventional telephone which acts as either a normal telephone in a telephone mode or as a transaction entry device in a transaction entry mode. When in telephone mode, the telephone operates in a conventional manner. However, when in transaction entry mode, the transaction entry device is driven by a microprocessor which is, in turn, driven by an operating system independent transaction assembly (or application) server (TAS) comprised of data streams stored in a flash PROM. The TAS is absolutely self-contained in its relationship to the hardware of the transaction entry device and in general performs the two basic functions of (1) generating a template or from from a data stream and (2) developing a data transaction as the user inputs data in response to prompts in the template or form. The template is a series of data streams read from a local flash memory or transmitted directly from an external source such as a database file server. TAS firmware may also be implemented in software, software loaded into hardware, hardware or a combination of hardware and software for performing the functions of a form-driven operating system.

During operation, the data entered by the user in response to prompts in the template are accumulated into data transactions that are immediately transmitted to an external database server. Unlike typical prior art systems, the data transactions are not locally stored for processing by the local microprocessor once the-data transaction has been completed. On the contrary, the only required storage in the transaction entry device is a flash PROM for storing the TAS firmware, a flash memory for storing the data streams used by the TAS firmware to complete a form and the modem numbers for the remote database servers, and a small RAM which operates as an input/output transaction buffer for storing the data streams of the template and the user replies to the prompts in the template during assembly of a data transaction. The transaction buffer(s) only needs to be as large as the largest data transaction since it only stores the form until the entire data transaction is completed. In this sense, the transaction entry device serves as an assembly point for specific transactions until they are ready for transmission to an external database server for processing and storage.

The data transaction formed by the transaction entry device is transmitted via modem to a local or remote database server for processing and storage. The data transaction is received via standard protocols at the database server which, depending upon the application, stores the entire data transaction, explodes the data transaction to produce ancillary records which are then stored, and/or forwards the data transaction or some or all of the ancillary records to other database servers for updating other databases associated with those database servers. Also, in response to requests from the transaction entry device, any of the database servers may send data streams back to the transaction entry device for use in completing the fields in the data transaction or in displaying new forms or menus for selection.

Thus, the data transaction system of the first embodiment of the, invention comprises at least three tiers: a first tier for capturing the data transaction from the user, where the data transaction has a one-to-many relationship to file structures; a second tier for exploding the data transaction into its component parts on a system-specific basis so that each component part has a one-to-one correspondence with a file; and a third tier for providing additional explosions of the data transactions on an application-specific basis so that each application has its own set of data transactions.

Preferably, the transaction entry device of the invention resembles a conventional telephone except that it includes a touch screen and an optional keyboard for data entry in addition to the conventional numeric and function keypad inputs. A telephone handset or headset is optional and may be replaced by a microphone and speaker. The transaction entry device of the invention also includes RS-232 and other input/output ports for accommodating other options such as a wireless (RF) receiver, a magnetic card and/or smart card reader, a video camera and video display, infrared controllers, and the like. The telephone preferably has normal touch-tone functions as well as mobile and cellular options. Preferably, the transaction entry device contains a microprocessor such as an Intel 80386SX or higher, one megabyte of flash memory for dynamically storing the data streams for the templates, one megabyte of flash PROM for storing the TAS firmware, and a 128 kB RAM which functions as a transaction buffer for storing the data streams of the templates and the user responses until completion of the data transaction. A graphics display screen may also be provided for displaying the templates to the user for the entry of the data that will form the data transactions. Preferably, the graphics display screen is on the order of 24 lines by 40 characters for a desktop unit and 12 lines by 40 characters for a cellular unit.

In an alternative implementation, the first embodiment of the invention includes a process that may be selected from the menu of the transaction entry device that creates a "visible" menu corresponding to a voice mail menu of a remote phone mail system. When such a process is selected, the telephone or modem interface makes a telephone connection to the remote phone mail system, and, once the connection is made, the data transaction assembler sends a data request for a visual representation of the phone mail menu of the remote phone mail system via the telephone connection to the remote phone mail system. A data stream containing the visual representation of the phone mail menu from the remote phone mail system is then returned via the telephone connection and stored in a memory of the transaction entry device for presentation to the display screen of the transaction entry device 12. When the desired phone mail menu option is selected from the "visible" voice mail menu, the data transaction assembler creates a data transaction indicating which menu item was selected and sends the data transaction to the remote phone mail system via the telephone connection. Based on the menu selection, the remote phone mail system then returns a data stream containing a visual representation of the next phone mail menu via the telephone connection for storage and display. This process is repeated until the calling party is required to leave a message or the called party is reached.

In a second embodiment of the present invention, a client computer system has client devices having a form-driven operating system, a presentation manager, an input device and an output device as well as other applications for carrying out tasks and for assisting in the generation of reports, menus, forms, messages, lists and other data. The applications may communicate with databases for the storage of forms, menus, reports and other data. A plurality of computers under the control of broad operations system server (BOSS) software are provided for receiving and transmitting transaction data to or from the client devices, other applications and databases. Advantageously, a locator server computer serves to retrieve IP address numbers, PSTN numbers and other network identification information for use in identifying and locating a user and a client device. A robust security system with a robust authentication scheme along with robust storage protects the transmission of sensitive or confidential data.

BRIEF DESCRIPTION OF THE DRAWINGS

The form-driven client computer system of the invention is further described with reference to the accompanying drawings in which.

DETAILED DESCRIPTION OF PREFERRED EMBODIMENTS

Figure 1:
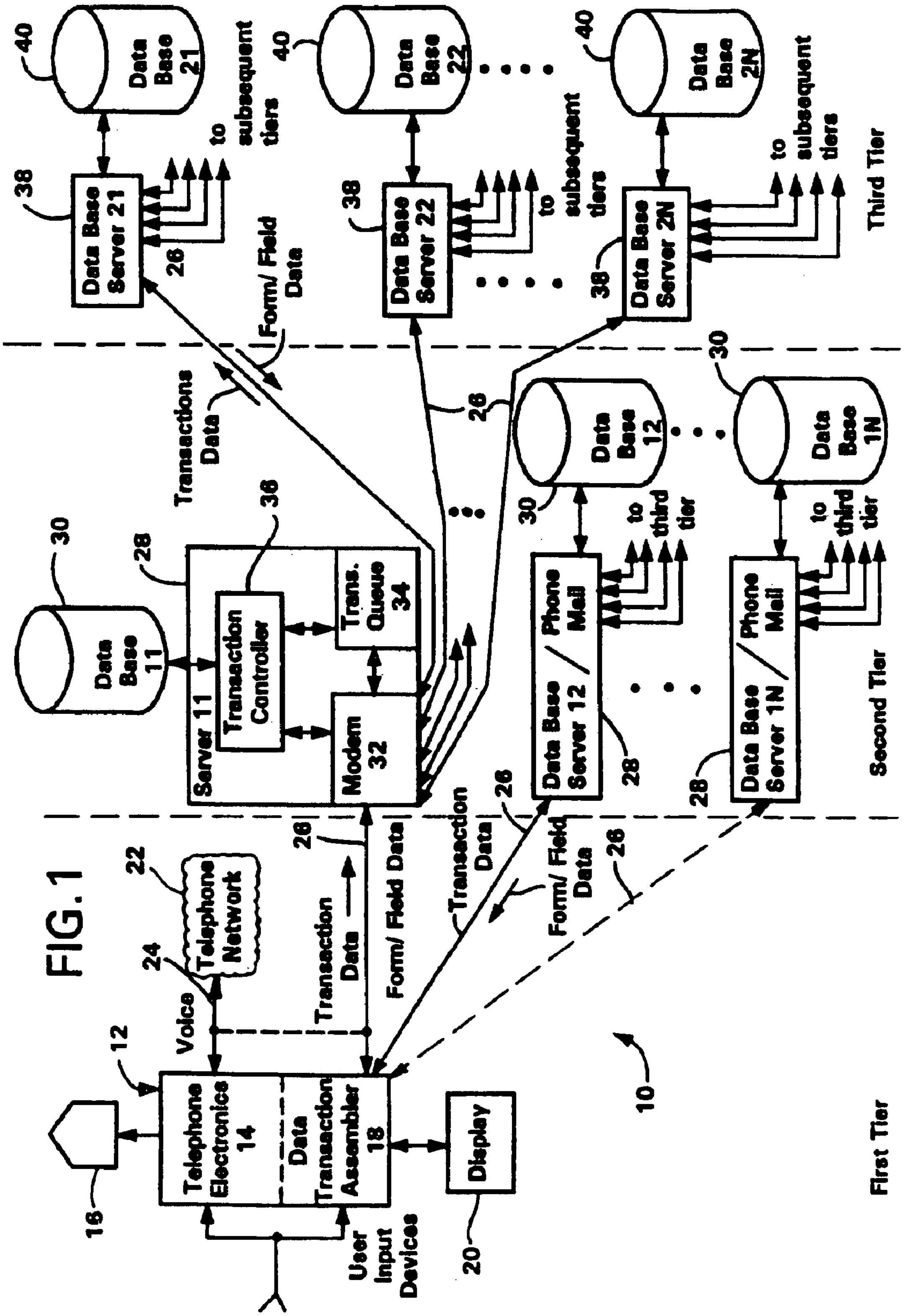
FIG. 1 is a schematic diagram of a system for entering data transactions into databases in accordance with a first embodiment of the invention.

A system and method which meets the above-mentioned objects and provides other beneficial features in accordance with presently preferred exemplary embodiments of the invention will be described below with reference to FIGS. 1–17. Those skilled in the art will readily appreciate that the description given herein with respect to those figures is for explanatory purposes only and is not intended in any way to limit the scope of the invention. For example, those skilled in the art will appreciate that the telephone/transaction entry device and system for entering data transactions into remote databases in accordance with the invention may be used in numerous settings in numerous applications, and other data entry devices may be utilized as well, and that the form-driven operating system of the present invention may be implemented with hardware, software or a combination of both. Accordingly, all questions regarding the scope of the invention should be resolved by referring to the claims.

1. Overview

The system of the invention provides for the automatic capture and computerization of data associated with data transactions as they occur. As used herein, a data transaction is the combination of a form or template or a series of forms or templates or other tabular information containing data entry prompts and the data entered in response to those prompts. Throughout the remainder of this specification, the words "form" and "template" will be used interchangeably. As alluded to in the background, the system of the present invention generally contemplates an operating system for transactions, forms, reports, messages, tabular information and the like without the baggage of a traditional, more complex operating system.

The data transactions are generated by a transaction entry device through an interactive process between the user and the form. The data transaction is assembled in a transaction buffer in the data transaction entry device and then transmitted to an external database for storage. No local storage for data transactions is necessary. The data transaction is defined externally by the database in that all applications consist of a series of customized forms and prompts for soliciting entry of the data needed to update the databases containing data related to the particular application. Generally, the data transaction will have a one-to-many relationship to the file structures of the databases containing data for that application.

In the first embodiment of the present invention, for example, the data transactions are entered using a transaction entry device. Preferably, the transaction entry device is integrated with telephone electronics so that the resulting device may selectively operate as a conventional telephone or as a data transaction entry device. The resulting transaction entry device preferably includes a touch screen and/or keyboard which provides input to a transaction assembly (application) server (TAS) which, in turn, presents selection options via menus and forms for completion by the user. As mentioned previously, TAS firmware may also be implemented in software, software loaded into hardware, hardware or a combination of hardware and software for performing the functions of a form-driven operating system. Menu and form selection and form completion is made by touch, by key selection from the keyboard, by moving a cursor to the appropriate selection point and depressing a key, or even by voice command. Whenever data entry (other than mere selection) is desired, it is accomplished via a menu-driven selection process and/or by direct entry of data using a keyboard, a keypad, a touch screen, and the like. In the menu-driven case, a set of options is presented to the display screen by the TAS firmware. If this set of options exceeds the capacity of the display screen, then the list is scrolled up or down through the use of scroll keys on the device, by voice command, or by touch at scroll command points. Once the selection is made, the data associated with that selection is automatically entered into the form from a local or remote database, or the data is input by the user. In the event of keyboard entry, the TAS firmware may present a keyboard at the bottom of the display screen for touch entry; alternately, an optional keyboard located at the base of the transaction entry device may be used.

When the data is entered independently of a selection process, such data also may be entered using a swipe card if the data resides on the swipe card or the data may be transferred into the data transaction via modem from an external source. The data read from the swipe card can be used to fill out a form or may be transmitted to an external database or computer. Data returned from the external database or computer via modem may also be used to fill out the fields in the form. As desired, the data in a data transaction may also be written to a swipe card or memory card and the like.

The TAS firmware of the invention stores the options as well as control programs (microcode) for the processor for use with the templates in creating the data transactions. The TAS firmware also includes a program allowing connection via modem to one or more external computers and databases. Preferably, two modes of operation are available: transaction entry mode (with or without modem connection) and telephone mode. A selection of either the transaction entry mode or the telephone mode is made through a switch selection on the transaction entry device. When the transaction entry device is placed in the transaction entry mode, the TAS firmware immediately presents a selection menu for all of the options the system is programmed to handle. In the telephone mode, on the other hand, a dial tone is provided and the telephone keypad is enabled. In telephone mode, one or more lines may be connected so as to allow simultaneous use of the transaction entry device without interfering with the modem connection. However, if a single telephone line is used, the telephone capability is available at all times or intermittently via modem as specified by the particular application. In the intermittent mode, upon a "save" the transaction entry device will control a dial up and transfer of data to a remote database server. On the other hand, if the telephone is used with an automatic dialer mechanism utilizing a phone list, the transaction entry device may automatically change from the telephone mode to the transaction entry mode. In this case, a display on the telephone may be used to present a name and telephone list from which a selection can be made in accordance with the menu selection techniques described below.

2. Data Transaction System (FIGS. 1–4)—A First Embodiment

FIG. 1 is a schematic diagram of a system 10 for entering data transactions into databases in accordance with a first embodiment of the invention. As illustrated, system 10 comprises a first tier for capturing a data transaction having a one-to-many relationship to file structures, a second tier for exploding the data transaction into component parts having a one-to-one relationship to file structures, and a third tier for providing additional explosion of the data transactions for specific applications.

The first tier comprises a transaction entry device 12 that captures the data transaction from the user in response to any of a plurality of inputs from the user. Transaction entry device 12 includes conventional telephone electronics 14 and speaker 16 and a data transaction assembler 18 for creating a data transaction in accordance with the invention. A display screen 20 is preferably associated with data transaction assembler 18 so that the user may monitor creation of each data transaction. Telephone electronics 14 are connected to a telephone switching network 22 via a conventional voice connection 24 over the telephone lines, while data transaction assembler 18 is connected via telephone lines 26 to one or more database servers 28. As illustrated in FIG. 1, telephone lines 24 and 26 may be separate lines, thereby permitting simultaneous use of the telephone and data entry functions, or the telephone electronics 14 and data transaction assembler 18 may be connected to a single line as illustrated in phantom in FIG. 1. Of course, when the telephone electronics 14 and data transaction assembler 18 are connected to a single line, a mode switch will enable their mutually exclusive operation, or alternatively, any of a number of conventional transmission schemes may be used to permit simultaneous transmission of the voice from the telephone electronics 14 and the data from the data transaction assembler 18 over the same line.

During operation in the transaction entry mode, transaction entry device 12 is responsive to user input devices such as a touch screen, a telephone keypad, a keyboard, a microphone, a swipe card, a memory card, video input, and the like, to form data transactions using data transaction assembler 18. Alternatively, the transaction entry device 12 operates in a telephone mode as a conventional telephone and receives inputs from a microphone and/or a handset, a touch tone keypad, and the like. More details of the transaction entry device 12 and data transaction assembler 18 will be provided in the next section with respect to FIGS. 5–10.

The second tier comprises one or more database servers 28 and their associated databases 30. In general, each database server 28 receives data transactions from one or more transaction entry devices 12 and "explodes" the received data transactions into their component parts for storage in the appropriate files of the associated database 30. In other words, the one-to-many file structure of the data transactions from one or more transaction entry devices 12 is converted into many one-to-one data transactions for storage in individual files of database 30.

Each database server 28 includes a modem 32 for transmitting/receiving data from the telephone lines 26, particularly the data transactions from one or more transaction entry devices 12. Preferably, the data transactions are transmitted over the telephone lines 26 as data packets having, for example, 128 bytes, where 120 bytes contain information and 8 bytes contain control data. A transaction queue 34 acts as an input buffer for the received data transactions and controls the rate of presentation of the data transactions to transaction controller 36. Transaction controller 36 processes the received data transactions to extract the physical file relationships of the component parts of the data transactions and stores the components parts and different combinations thereof in the appropriate files of associated database 30. Alternatively, transaction controller 36 may process a data request from data transaction assembler 18 requesting information from database 30 for completing certain fields of a data transaction being processed by the transaction entry device 12. Database 30 then provides the requested information to database server 28 which, via modem 32, provides a data stream back to data transaction assembler 18 for use in completing the data transactions or presenting additional menus and forms in accordance with the invention. Typically, a user ID and password are transmitted to the transaction controller 36 to permit a connection to be made by data transaction assembler 18. Thus, transaction controller 36 also checks and stores startup and logoff information in addition to storing data transactions and directing reconstituted data transactions to other database servers as described herein. In addition, database server 28 may include a conventional phone mail system with an associated database for storing voice mail messages. In this case, the data transaction may include voice data for storage in the remote voice mail system.

As shown in FIG. 1, several database servers 28 may be provided. Preferably, each transaction entry device 12 has an associated database server 28 for performing any desired processing of its data transactions, although it is preferred that the data transactions be copied to at least one other database server 28 as shown in FIG. 1. This redundancy minimizes the possibility of losing data in the event of a power outage and the like. Preferably, each database server 28 contains essentially the same hardware, although modem 32, transaction queue 34, and transaction controller 36 have not been shown for all database servers 28 for ease of illustration.

In transaction entry mode, the data transaction assembler 18 of transaction entry device 12 creates a data transaction that is transmitted to an associated transaction controller 36 of an associated database server 28. By "associated" it is meant that the database server 28 functions to perform any processing requested or necessary in conjunction with the storage of a data transaction from a particular transaction entry device 12. Of course, a particular database server 28 may have several transaction entry devices 12 associated with it. So that no data will be lost, a particular database server 28 may also serve as a backup for another database server 28 in the event of the failure of any database server 28.

As will be explained in more detail below with respect to FIGS. 2–4, database server 28 "explodes" data transactions received from data transaction assembler 18 and provides the component parts of the "exploded" file dependent data transactions via modem 32 to other database servers 28 as necessary to update other databases. Alternatively, as shown by dotted line in FIG. 1, the "explosion" of the data transactions may be performed by the data transaction assembler 18 at the transaction entry device 12 and the component parts transmitted to all appropriate databases 28 for updating the data therein. For this purpose, the data transaction assembler 18 will also need to know the modem numbers for all database servers 28 to be updated by the exploded data transactions. However, those skilled in the art will appreciate that this latter alternative will require access to numerous phone lines by the transaction entry device and that such phone lines are not always available to the user.

Finally, the third tier of the system 10 includes additional database servers 38 and databases 40 that support file dependent data transactions for specific applications. This additional tier of database servers 38 and databases 40 permits the data in the data transactions to be routed to application specific databases for storage of application specific data and access by those transaction entry devices 12 requesting data related to that specific application.

The creation and storage of a data transaction in accordance the first embodiment of the invention will now be described with respect to FIGS. 2–4.

Data transactions are created by data transaction assembler 18 as a data stream of a known format. A generic data transaction is illustrated in FIG. 2. As defined herein, a data transaction is created using a form containing one or more of the following: instructions, prompts, menu selection options, and a template with fields for data entry. Generally, the menu form consists of prompts for selecting a form, another menu, or a process, and a single slot for entering a selection, while the data entry form consists of prompts and instructions together with fields for entering data as shown in FIG. 2. The data entry form can have either single or multiple fields for entering data.

In transaction entry mode, the user navigates through menus of data transaction assembler 18 until a form related to a particular type of data entry operation is selected. Once selected, data transaction form 42 is presented to the user on display device 20. The data transaction form 42 is a collection of data defining the visual presentation on the display device 20 and a list of the fields through which linkages to external database files are defined.

Figure 2:
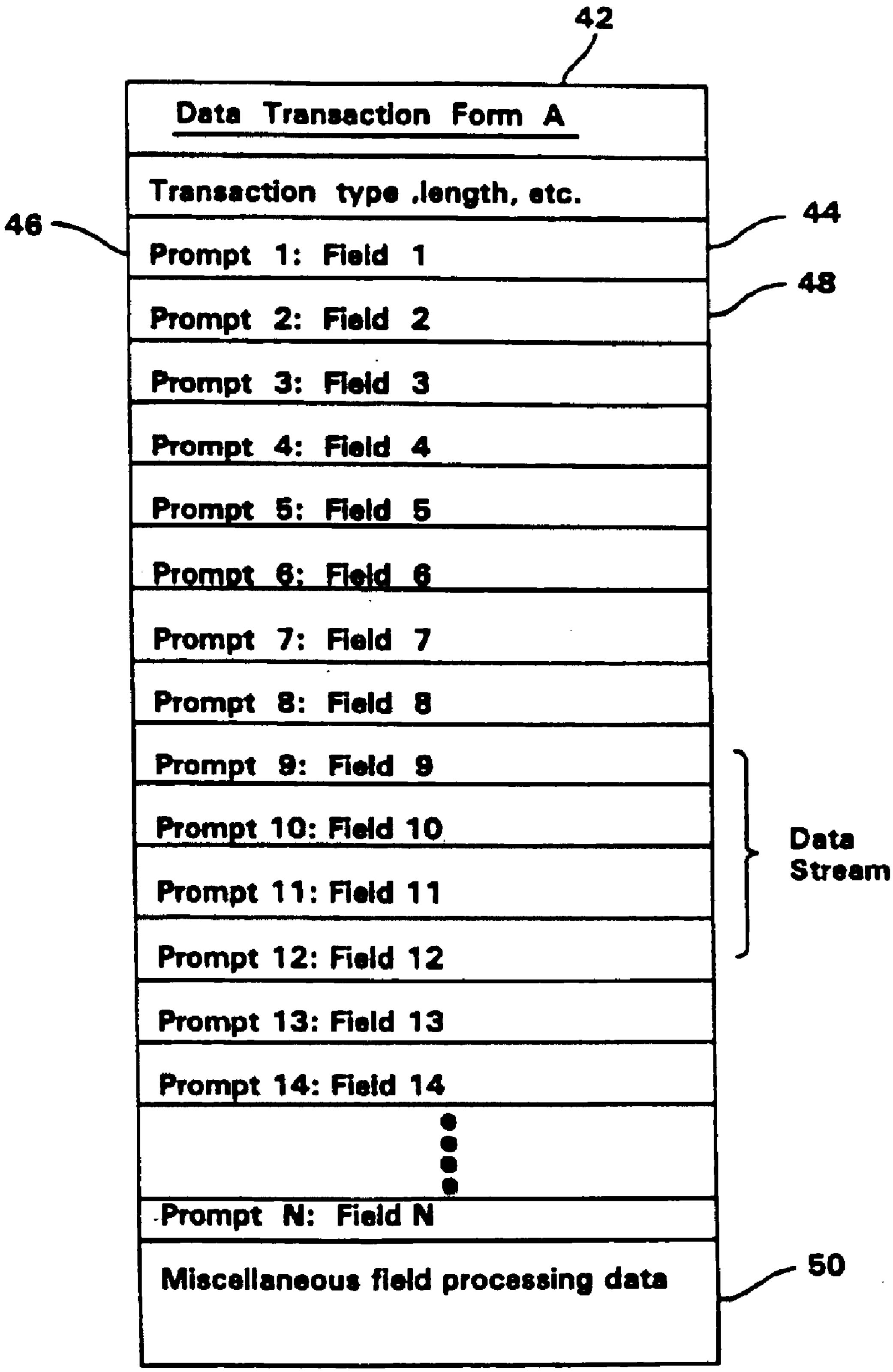
FIG. 2 illustrates a generic template for use in creating a data transaction in accordance with the first embodiment of the invention.

As shown in FIG. 2, data transaction form 42 includes a format field 44 which identifies the type of data transaction this form pertains to, the length of the form, the number of pages in the form, the number of bytes in each field, storage keys, and the like. The body of the data transaction form 42 comprises a predetermined series of prompts 46 that are provided to the display screen 20 as a data stream. The prompts preferably include descriptive data that may be alphanumeric, an icon, or a list that scrolls, if necessary. Fields 48 are blank spaces of predetermined size provided for accepting user input in response to each prompt. Generally, the size of each field 48 is also stored in the stream of data defining the data transaction form 42. Since the prompts are tailored to elicit the necessary data for the application for which the data transaction form 42 was created, the fields 48 will include the user data necessary for processing a data transaction for that particular type of application. The user responses become part of the data stream which forms the data transaction. Typically, the data transaction form 42 also includes a miscellaneous processing field 50 that permits processing data unique to that form to be appended to the data transaction for transmission. Such processing data may include, for example, equations that define the relationships of the data in certain fields of the data transaction or audio or video data attached to a multimedia data transaction. In addition, non-display data associated with the time of data entry, the date of data entry, the user ID, and the like may be stored in miscellaneous processing field 50.

Figure 3:
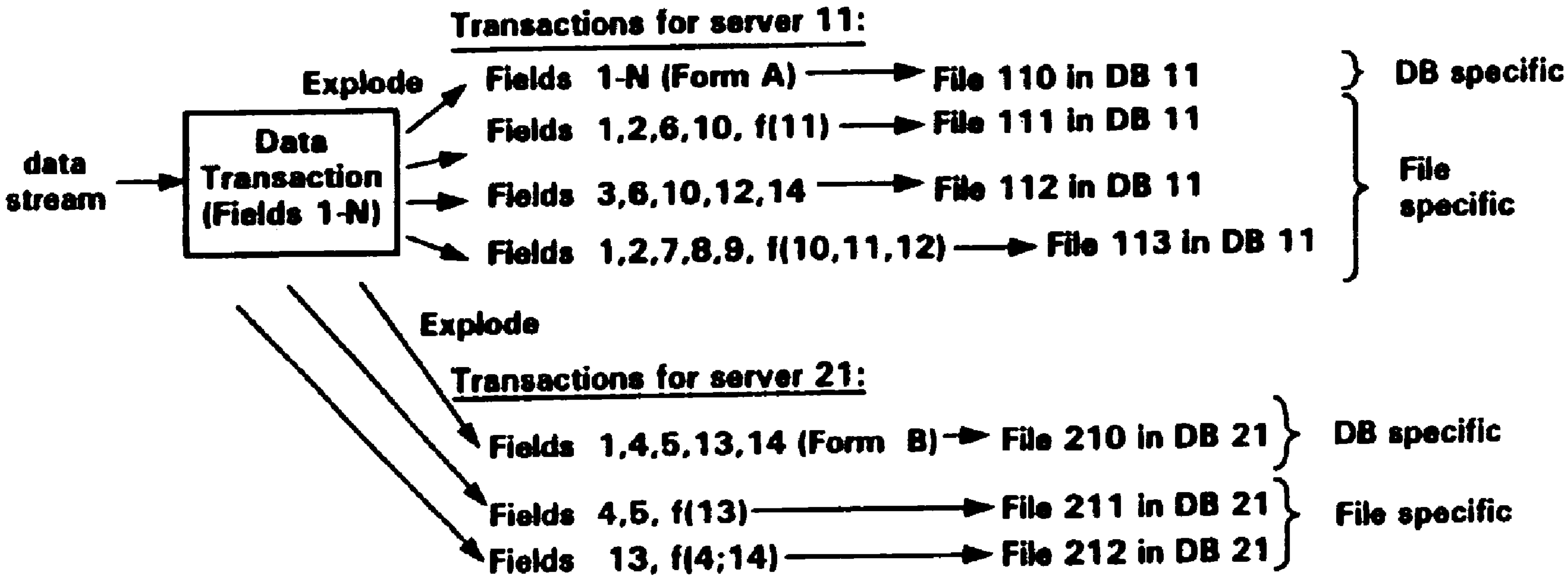
FIG. 3 illustrates an "exploded" data transaction in which the component parts of a data transaction are stored in database-specific and file-specific locations.
Figure 4:
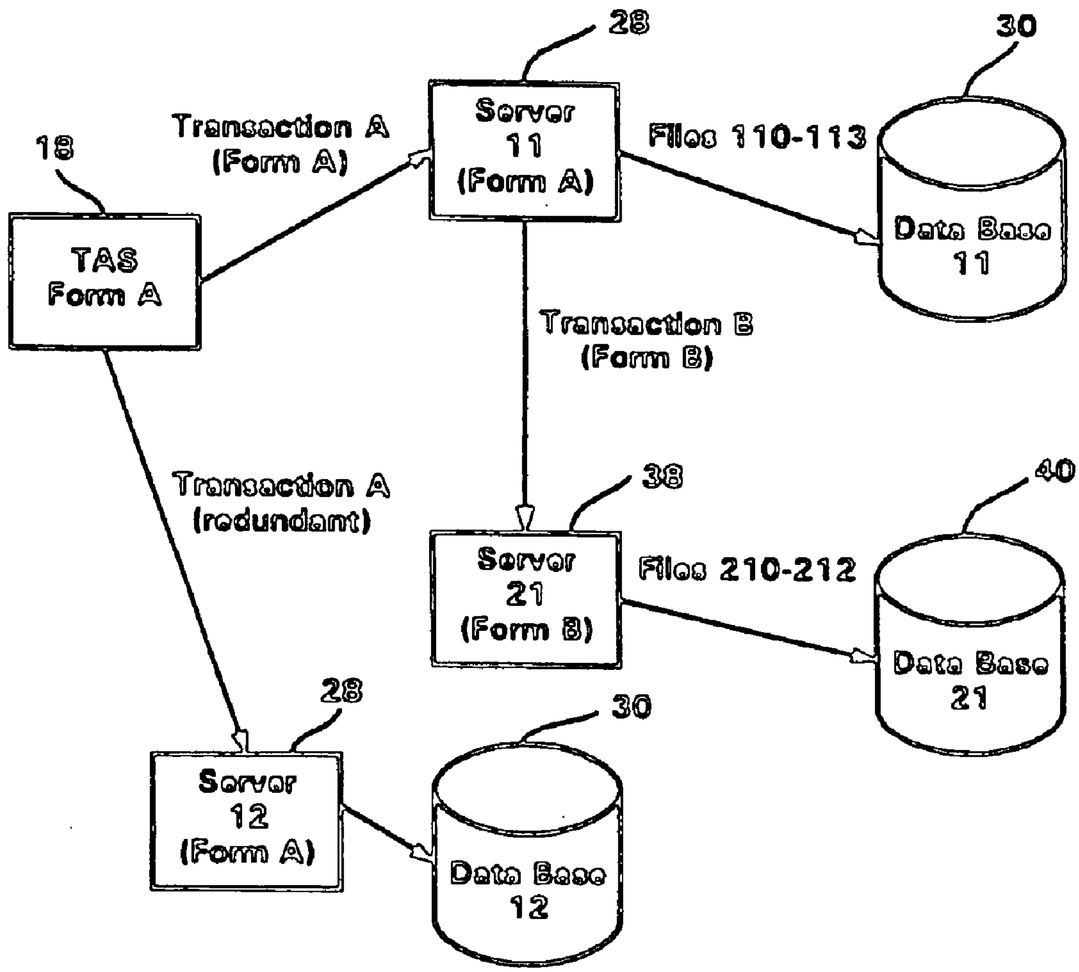
FIG. 4 illustrates the "exploded" transaction of FIG. 3 in the context of the system illustrated in FIG. 1.

FIGS. 3 and 4 illustrate the "explosion" of the stream of data forming the data transaction created using the data transaction form 42 of FIG. 2. As shown in FIG. 3, each data transaction contains data that is specific to a particular database and/or specific to particular files in one or more databases. The data in the data transaction is "exploded" accordingly. For example, the complete data transaction from FIG. 2 (Form A) is stored in a particular file (file 10) of the database associated with the transaction entry device 12 which created the data transaction (database 11 in FIG. 1). Storage of the entire data transaction is desired so that records may be maintained in the event of system error, power failure, and the like. The transaction controller 36 then extracts data from those fields of the data transaction that it knows to be related in forms of that particular type. For example, the data in fields 1, 2, 6, 10, and a function of the data in field 11 may relate to a particular application stored in file 111 of database 11. Similarly, the data in fields 3, 6, 10, 12, and 14 may be related to an application stored in file 112 of database 1, while the data in fields 1, 2, 7, 8, 9, and a function of the data in fields 10, 11, and 12 may be related to an application stored in file 113 of database 11. These fields are extracted from the received data transaction by transaction controller 36, reconstituted into a file entry of the appropriate format (as necessary), and stored in the associated database 30.

All of the data in the received data transaction, or a subset thereof, may also be retransmitted to one or more additional application specific databases, such as database 21 of the databases 40 in tier 3. As illustrated in FIG. 3, the database specific data of fields 1, 4, 5, 13, and 14, forming the subset (Form B) of the original transaction (Form A), is stored in file 210 of database 21 so that a complete record may be maintained. Subsets of the data in Form B are then stored in specific files of database 21 as indicated. In this manner, the data of the original data transaction (Form A) is automatically sent to all databases which contain files which must be updated by any or all of the data in Form A.

FIG. 4 illustrates the explosion of the data transaction in FIG. 3 for the system 10 illustrated in FIG. 1. As shown, the data in the data transaction (Form A) is extracted to update files 110–113 of database 11 as well as files 210–212 of database 21. A redundant copy of Form A is also maintained in database 12.

As will be explained more fully below, the system of FIGS. 1–4 is significant in that the data in a data transaction may update one or more databases serviced by file servers operating under control of numerous types of operating systems without the requirement of a terminal or operating system emulation by the transaction entry device 12. On the contrary, the transaction entry device 12 of the invention permits data capture and storage with a minimum amount of processing at the transaction entry point (tier 1), which, of course, minimizes system cost.

3. Exemplary Transaction Entry Device 12 (FIGS. 5–10)

In accordance with the present invention, any data entry device may be utilized; however, preferably the transaction entry device 12 is as described with respect to FIGS. 5–10 for the first embodiment of the invention. As noted above, the transaction entry device 12 is particularly characterized by the data transaction assembler 18, which controls the various operations of the transaction entry device 12 in its transaction entry mode. Preferably, data transaction assembler 18 uses simple menu structures and predetermined forms stored as data steams in a flash memory for facilitating data entry. The menus are treated as a special type of form and are used to call other menus, forms, or processes. The forms, on the other hand, are used to create data transactions which are sent to one or more file servers operating under different operating systems, where the data transaction is "exploded" into its component parts for storage in a unique file structure for updating all records affected by the data in that data transaction. In turn, the "exploded" data transactions may be transmitted to another application specific database (tier 3) for storage. Processes, on the other hand, are selected to perform limited processing of the values in the fields of the forms. Such processing may be performed locally but is preferably performed by the associated database server 28.

a. Hardware

Figure 5A:
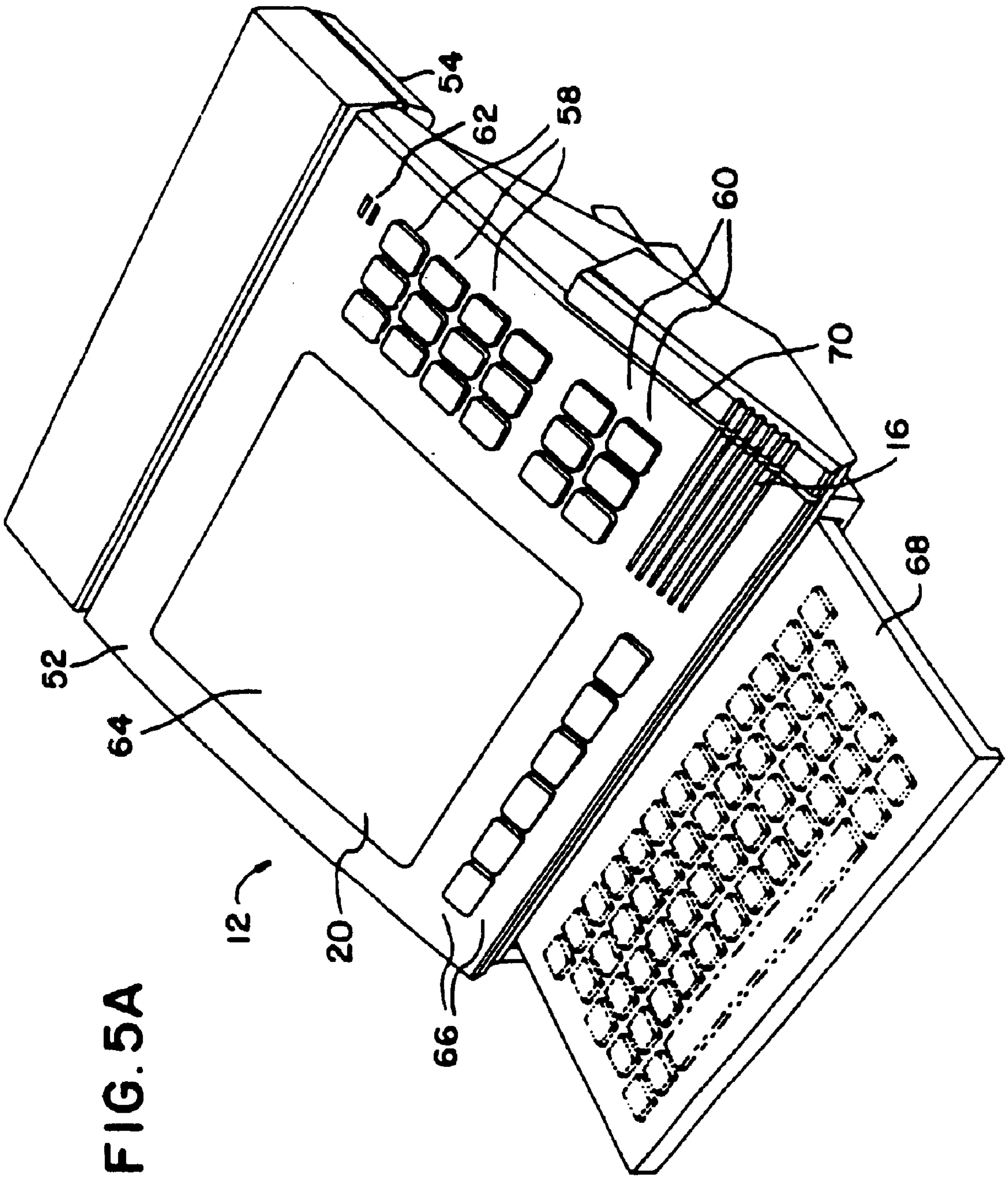
FIGS. 5A and 5B together illustrate a preferred embodiment of a transaction entry device in accordance with the first embodiment of the invention.
Figure 5B:
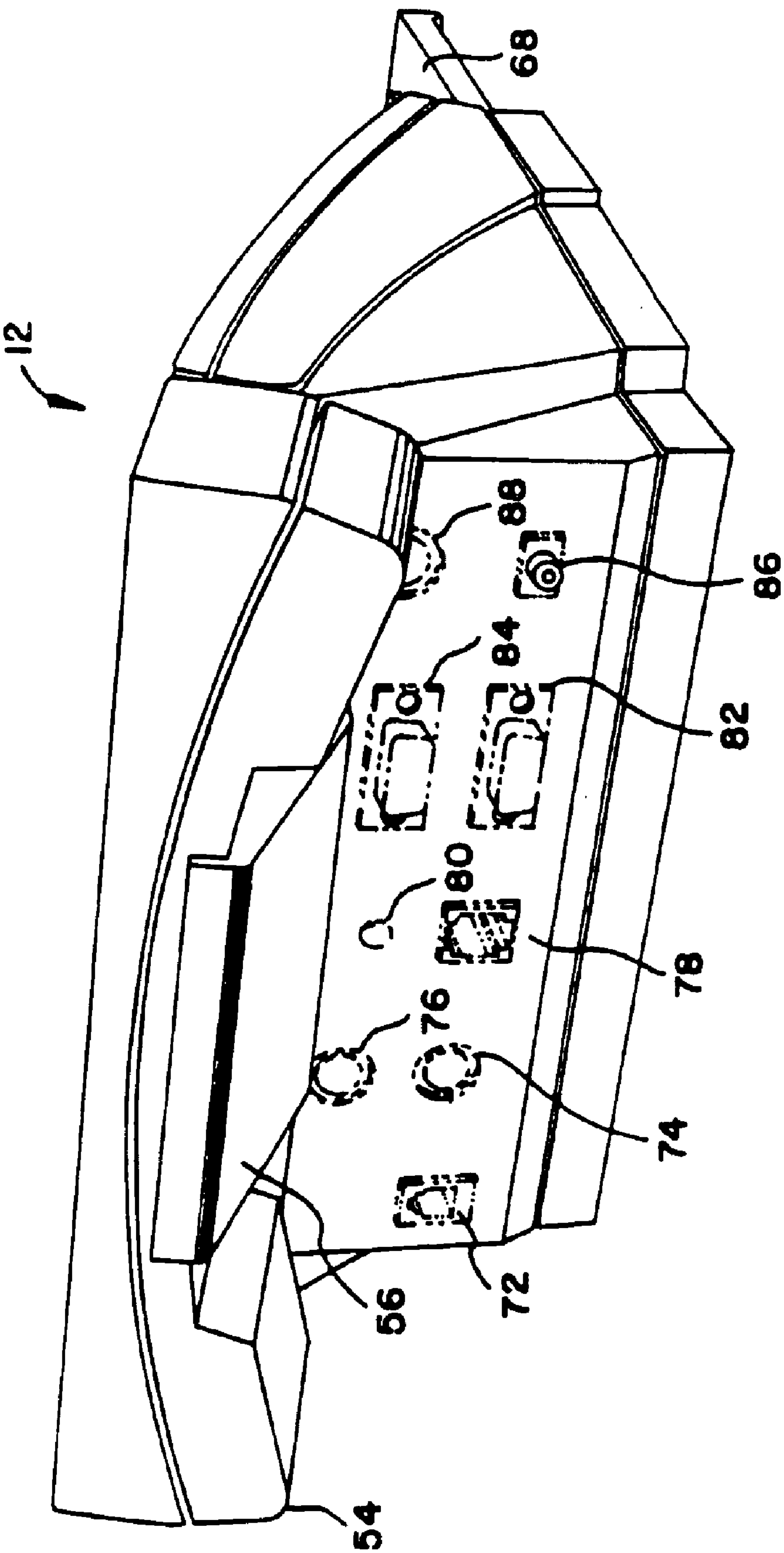
Figure 6:
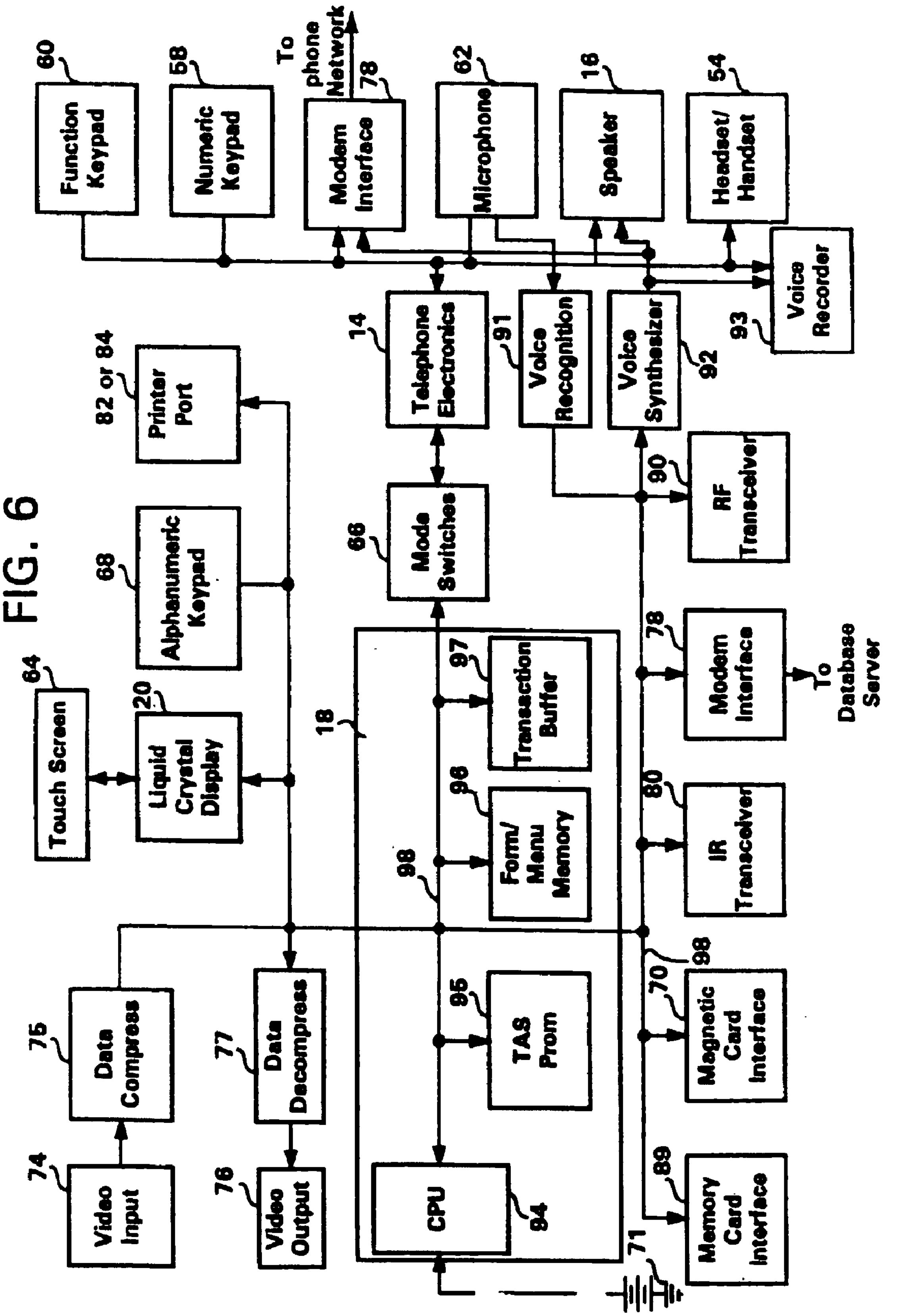
FIG. 6 is a schematic diagram of the electronics of the transaction entry device illustrated in FIGS. 5A and 5B.

A preferred embodiment of a transaction entry device 12 incorporated into a conventional telephone is illustrated in FIGS. 5 and 6. As shown in FIG. 5*a*, a preferred u desktop embodiment of a transaction entry device 12 includes a housing 52 on the order of 8 inches wide by 12 inches long for housing telephone electronics 14 and the hardware of data transaction assembler 18. Transaction entry device 12 includes an optional handset (or headset) 54, cradle 56 (FIG. 5*b*), numeric keypad 58, telephone function/line keys 60, microphone 62, and speaker 16, which facilitate operation of the transaction entry device in the telephone mode. As known to those skilled in the art, telephone functions accessed by telephone function keys 60 may include mute, speaker, line select, conference, hold, transfer, volume control, and the like.

However, the transaction entry device 12 is further characterized by display 20 with touch screen 64, mode switch/ computer function keys 66, optional retractable keyboard 68, and optional magnetic/smart card reader 70, which facilitate operation of the transaction entry device 12 in the transaction entry mode. A memory card reader may also be accessed via a door (not shown) as in a laptop computer. Preferably, display 20 is a super twisted, high contrast, reflective liquid crystal display (LCD) with a minimum of 20 characters per line and 16 lines (preferably, 40 columns by 24 lines), while touch screen 64 is preferably a clear pressure sensitive keyboard made up of 224 keys (16 rows of 14 keys) attached to the face of the LCD. Preferably, the LCD is also available as a backlit unit. Of course, touch screen 64 is not necessary if optional keyboard 68 is provided. In addition, a battery backup 71 (FIG. 6) may also be provided; alternatively, the battery 71 may be the primary power source for a portable (cellular) embodiment of the transaction entry device 12 in accordance with the invention.

FIG. 5*b* illustrates several of the connections to transaction entry device 12. Typically, transaction entry device 12 includes a handset (headset) jack 72 for connecting optional handset (headset) 54 to telephone electronics 14 when it is desired to communicate more privately than when only microphone 62 and speaker 16 are used. A video input port 74 is also provided for connecting conventional data compression circuitry 75 within the transaction entry device 12 (FIG. 6) to an optional video camera which provides picture phone type video or to a facsimile device or scanner. Such video data may be appended a frame at a time to the end of a data transaction in miscellaneous processing field 50 to create a multimedia data transaction as described above with respect to FIG. 2. A video output port 76 is also provided for providing decompressed video or facsimile data from data decompression circuit 77 (FIG. 6) to a video receiver, a high quality computer monitor, a facsimile device, and the like. Such data may also be provided to printer port 82 or 84 as desired. A multi-line phone jack (modem interface) 78 is also provided. Preferably, modem interface 78 provides separate modem connections for the telephone electronics 14 and the data transaction assembler 18, although only a single modem connection is necessary.

An optional infrared transceiver 80 is further provided for enabling remote control operation of television and stereo equipment and the like in response to data transactions transmitted/received by the transaction entry device 12. Infrared transceiver 80 includes an internal signal generator chip that reads parameters stored in data transaction assembler 18 for determining the appropriate transmission frequencies for the infrared signals. Control of the infrared devices is then provided through menus on the display 20. Additional infrared transceivers 80 may also be provided on each corner of the housing 52 so that the infrared signal will cover more area (each transmitter typically covers about 60° circumference). All such devices are known to those skilled in the art and thus will not be described in detail here.

A computer interface (RS-232) serial port 82 and parallel port 84 is also provided for transmitting/receiving data to/from another computer device and for providing output to a printer. A power input port 86 and a keyboard input 88 are also provided. Keyboard input 88 accepts a connection from a standard keyboard or a folding type keyboard (not shown) which may be used in addition to, or in place of, retractable keyboard 68. An optional removable PCMCIA memory card interface 89 (FIG. 6) for updating the operating instructions of the data transaction assembler 18 and an optional RF transceiver 90 (FIG. 6) for wireless networking to other electronic equipment may also be provided on the transaction entry device 12 as desired. FIG. 6 is a schematic diagram of the electronics of the transaction entry device illustrated in FIGS. 5A and 5B. Corresponding reference numerals for corresponding elements are used in FIGS. 5A, 5B and 6. As shown in FIG. 6, in addition to the elements described above with respect to FIGS. 5A and 5B, the transaction entry device 12 may include a simple voice recognition circuit 91 which permits voice selection of menu options and the like. In "voice selection" mode, the user would voice "1", "2" or "3" depending on the desired menu selection, and the voice would be picked up by microphone 62 on the housing 52 of the transaction entry device 12 and recognized by voice recognition circuitry 91. The proper selection signal would then be sent to the data transaction assembler 18. Similarly, the data transaction assembler 18 may provide audible output using a conventional voice synthesizer 92, which provides the audio output to the user via speaker 16 and to a caller via modem interface/telephone line connection 78. The voice synthesizer 92 may, for example, allow certain data transactions to be audibilized for a blind person who cannot make selections from a conventional video display. In addition, a voice recorder 93 may also be provided to record portions of telephone calls, portions of voiced data transactions, or a caller's message as when using a conventional digital answering machine. On the other hand, voice recorder 93 may be provided in database server 28 for use in storing/forwarding audible messages to the database 30.

As noted above, the transaction entry device 12 is characterized by data transaction assembler 18, which controls the creation of data transactions in the transaction entry mode. As shown in FIG. 6, data transaction assembler 18 is implemented in hardware using a conventional microprocessor 94, such as an Intel 80386SX (20 MHz or higher) or equivalent, a TAS PROM 95, a form/menu memory 96, and a transaction buffer (RAM) 97. In a preferred embodiment, TAS PROM 95 is a flash PROM which holds 1 MB of control data (firmware) for the microprocessor 94 (such as the microcode for the algorithms of FIGS. 7–10 below), while form/menu memory 96 is a flash memory which holds 1MB of data transaction menus and forms. Transaction buffer 97, on the other hand, only needs to be as large as the largest data transaction, and may hold, for example, up to 128 kB of transaction data including application and operating system variables. Preferably, TAS PROM 95 and form/menu memory 96 are updated by downloading data streams containing new instructions and/or forms and menus over a conventional data bus 98 via modem 78, magnetic card interface 70, or via a removable memory card read by memory card interface 89 as necessary. Alternatively, additional flash memory elements may be added as additional applications are added to transaction entry device 12. Transaction buffer 97 may also be expanded to handle transactions of any size or type, including multimedia applications in which video and/or audio data is appended to data transactions.

Those skilled in the art will appreciate that the transaction entry device 12 may be docked into a docking station of a network. RF transceiver 90 may be used for wireless communications in such an environment. In addition, those skilled in the art will appreciate that the transaction entry device 12 may be implemented as a battery operated portable device which is a cross between a laptop computer and a cellular telephone of the type illustrated by Paajanen et al. in U.S. Pat. No. 5,189,632, for example. In such an embodiment, an optional headpiece could be provided, as well as a microphone and speaker arrangement in the fliptop. Of course, the liquid crystal display screen 20 would typically be reduced in size to, for example, 40 columns by 12 rows, and the touch screen 64 may be eliminated. However, most of the other options of the embodiment of FIGS. 5*a* and 5*b* would preferably remain so that the portable unit could also be used at a desk as desired. The electronics of the transaction entry device 12 would otherwise be as illustrated in FIG. 6 except for certain size and shape considerations well within the skill of those skilled in the art.

b. Software

As will be apparent from the following description, data transaction assembler 18 does not utilize a conventional operating system to control the operation of microprocessor 94. On the contrary, TAS PROM 95 stores simple firmware algorithms (FIGS. 7–10) operating in a kernel fashion for navigating a user through menus and forms provided from form/menu memory 96 for particular applications, and it is the resulting data streams which control the microprocessor 94 at any point in time. In other words, the data streams from the TAS PROM 95 and the data streams from the form/menu memory 96 together reconfigure microprocessor 94 into a special purpose processor for each application specified by the forms. The microcode of the TAS PROM 95 and the parameter streams from the form/menu memory 96 thus operate together as a simple form driven operating system for microprocessor 94 for all applications and is the sole code used to control microprocessor 94 (i.e., no conventional operating system or application programs are provided). As a result, the microprocessor 94 may be reconfigured into a new special purpose computer with each new form read from form/menu memory 96, and such forms/menus may be added at any time by reading in the appropriate data streams from a memory card or from an external database server 28 or by adding an additional PROM. A specific implementation of the TAS firmware stored in TAS PROM 95 will be described below with respect to FIGS. 7–10.

Thus, the TAS PROM 95 contains control data (firmware) for the microprocessor 94 and resides in each transaction entry device 12 for generating a template for a data transaction from a data stream stored in form/menu memory 96 (or received directly from a memory card or external database server) and from data input by a user or retrieved from an external database or magnetic card, smart card, and the like. The TAS firmware and the selected template together control the behavior of the microprocessor 94 by logically defining a table of menu options and/or database interfaces that are navigated through by the user. As noted above, the user navigates through a series of menu selections by selecting another menu, a form, or a process. Once the data transaction for a desired application is completed, it is transmitted out for "explosion" into all of its component parts for storage. In this form, the TAS firmware from TAS PROM 95 and menus and forms from form/menu memory 96 of the invention together replace a conventional operating system and individual application programs. Indeed, the invention permits the transaction entry device 12 to be completely operating system independent.

The data transaction assembler 18 of the invention is connected via a predetermined protocol stored as instructions within TAS PROM 95 to a database server 28 and its associated database 30. As noted above, the database server 28 associated with a particular transaction entry device 12 operates as a repository of the data transactions created by the transaction entry device 12 and as a supplier of data to the transaction entry device 12 for completing the forms and providing additional forms, menus, processes, and the like. Since the system of the invention is operating system independent, there are no hardware or software limitations on the characteristics of the database server 28.

The parameter set making up the individual forms are typically provided by database server 28 as a stream of data via modem and stored in form/menu memory 96, while any downloaded instructions are stored in TAS PROM 95. Linkage between data transaction assembler 18 and its database server 28 is preferably provided via a dictionary program specific to each database server 28. This dictionary program knows the characteristics of each field of each form for each data transaction and is used by the database server 28 to "explode" the received data transactions into their component parts.

Preferably, at power on, data transaction assembler 18 automatically prompts the user with a "Download Parameter Streams" command so that the user can load into form/menu memory (flash memory) 96 from an external source the desired streams of menu and form data for the desired application. The "download parameter" process will then be initiated by dialing the external database server 28 initiating the connection via the modem interface 78. Once connected, the transaction controller 36 of database server 28 will transmit the requested parameter stream. The data transaction assembler 18 will load the received data stream into form/menu memory 96, and, upon completion, the prompt "Executive Menu Ready" will be presented on the display screen 20. The executive menu then will be automatically presented to the user for selection of the desired menu, form, or process.

Upon initiation of the transaction entry mode by the user, data transaction assembler 18 calls a set of panel parameters from form/menu memory 96 and paints a form onto display screen 20. These forms are either menus for navigating to particular forms or a form into which data is entered by the user. As will be explained below, the menus provide functionality through simple menu selection. The form on the display screen 20 is completed by the user by entering the appropriate data using touch screen 64 or optional keyboard 68. Alternatively, the requested data may be read in from a memory card via memory card interface 90, from a magnetic strip on a swipe card or smart card via magnetic card interface 70 or memory card interface 89, or voice input via voice recognition circuit 91. In addition, a request may be sent to the database server 28 associated with the transaction entry device 12 for data needed to populate certain fields in the present form. The type of data entry is requested from a subset of options presented to the user upon pressing a "?" key or a "Request for More Information" button. This request will give the user several options to choose from, such as data entry using keyboard 68, touch screen 64, swipe card via magnetic card interface 70, memory card via memory card interface 89, by voice annunciation of the number of the item in the menu via voice recognition circuit 91, or via modem from a database 30. Hence, the data transaction created by the data transaction assembler 18 may or may not make use of stored data for reducing the amount of data entry required of the user.

When a data entry option is selected, data transaction assembler 18 does one of the following: another set of parameters is called up and another form is painted, the correctness of the selection is verified and a set of options for selections is presented based on interactions with stored data, the completed data transaction is transferred via modem to database server 28 for storage in database 30, or data values are requested from database 30 for incorporation within the transaction buffer 97. In a preferred embodiment, selections from the menu are made by touching the appropriate place on the menu using touch screen 64; by voice annunciation of the number of the menu item via microphone 62 and voice recognition circuit 91; by using one of the computer function keys 66 to run a cursor up the menu, another key to run the cursor down the menu, and a third key to make a selection in a conventional manner; or by using keyboard 68 as a selection device. When the keyboard 68 is used, the keyboard keys may be used to control a cursor, with the "enter" key being used for making a selection; alternatively, the number of the item selected may be entered and the "enter" key pressed to make the selection. Once the selection is made, the appropriate form is extracted from form/menu memory 96 as a stream of data.

Alternatively, in addition to presenting a menu for selection or completing a form, the data transaction assembler 18 can also present a menu selection for initiating a process such as calculation of an interest rate using one or more fields in the form, the finding of a mean, the finding of a name, or searching for entries for a particular date. These processes may be stored in TAS PROM 95, form/menu memory 96, in an off-line server where they are initiated, or any other place where they may be loaded down to the operating portion of the transaction entry device 12. In a preferred embodiment, processes are generally initiated in the database server 28 by sending a data request to the database server 28, processing the data in the database server 28, and then returning the answer as a data stream or report back to the transaction entry device 12.

A process typically initiates a data string that calls a process on an external machine. For example, the transaction entry device 12 may be used to download and store control signals for infrared control of various devices using infrared transceiver 80 (FIGS. 5 and 6). The form of the control signals will depend upon the signal storage in an optional infrared chip, which can be loaded by the data transaction assembler 18 or by an off-line device via modem or through the air using RF transceiver 90 for direct digital transfer in wireless form. In addition, in the case where the transaction entry device 12 is used in a medical office, for example, the process may be used to transmit a prescription to a pharmacy or mail order house using prestored modem numbers or may enable the physician to call up a list of phone calls to make for the day or a list of the followup appointments for a particular date. In other words, the TAS firmware can also "explode" the data transaction into all of its ancillary parts for transmission to numerous records in one or more databases.

A preferred embodiment of the TAS firmware will now be described with respect to FIGS. 7–10. As mentioned above, TAS firmware may be implemented in software, software loaded into hardware, hardware or a combination of hardware and software for performing the functions of a form-driven operating system.

Figure 7:
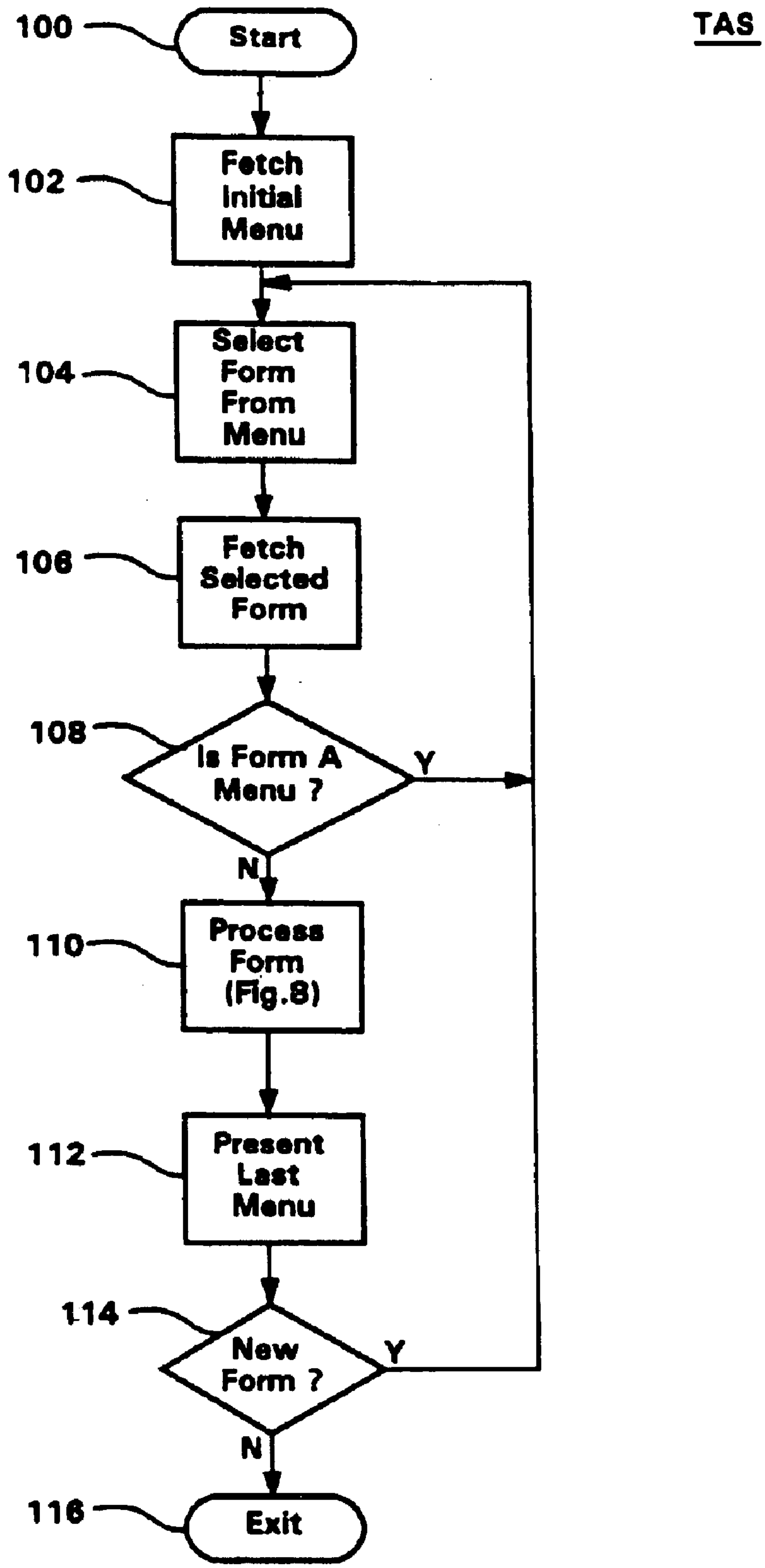
FIG. 7 is a flow diagram of a menu driven transaction assembly (application) server (TAS) in accordance with the invention.

As noted above, the transaction assembly (application) server (TAS) is a data stream stored in TAS PROM 95 which together with the forms from form/menu memory 96 create a simple form driven operating system which provides the necessary control data (firmware) to microprocessor 94 so that no conventional operating system is necessary. FIG. 7 is a flow diagram of a menu driven TAS in accordance with a preferred embodiment of the invention. As illustrated, the TAS firmware starts at step 100 and fetches an initial menu from form/menu memory 96 at step 102. The initial menu is prompted within a few seconds of booting the TAS firmware after the system logo. The initial menu typically presents the options of downloading a parameter stream from the database server 28 for enabling additional functions or printing an executive menu. If the executive menu is selected, the executive menu is retrieved from form/menu memory 96. The executive menu contains numerous application options to the user, namely, selection of a form, another menu, a process, or an automatic switch to telephone mode, one of which is selected at step 104. The data streams in form/menu memory 96 may be distinguished as to type (form, menu, or process) by appending a code such as. "F" for form, "M" for menu, and "P" for process, and as to number by appending a form, menu, or process number at the beginning of the following data stream. These codes are recognized by the TAS firmware, and it acts accordingly.

If the option selected at step 104 is a form, the proper form (data stream for form $F_{xy}$) is fetched from form/menu memory 96 at step 106, a transaction buffer 97 equal in length to the size of the record associated with the form $F_{xy}$ is formed in RAM, the form is stored in the transaction buffer 97, and a connection is made to the appropriate database server(s) 28. The data stream for the selected form will consist of prompts, print locations for the prompt, data entry points, print locations for the data entry start, data entry length, and a code as to the nature of the data entry. This code can be numeric, alphanumeric, a cross-reference to stored data or previously entered data, a formula for the creation internally to data transaction assembler 18 of the result from previously entered data, or an external request for data, help, or reformulated values. The data stream entered into the fields of the form will not only indicate the location for the printing of the prompt and the field for data entry, but also the size of the field and the storage, a start point within the transaction buffer for the stored element, and the type of data: alphanumeric, numeric (floating point or integer), date, and the like.

If it is determined at step 108 that the requested form is actually a menu ($M_{xy}$), a hidden set of codes pointing to the form $F_{xy}$ that the selection will lead to is read, and control branches back to step 104 for selection of another menu or form. When a menu is chosen, each item has its sequential number, its descriptor, and a code for what it will "call" (another menu, form, or process). In other words, each choice has associated with it a series of item codes that branch out to another form, menu, or series of tests upon the data entered. A menu also has a numeric code for each of the storage areas and a special code including a security code for certain menu items, process codes of forms within the menu, or a pointer to the process code. A pointer may also be provided in the menu for processes to be performed off-line (ie., in an associated database server 28).

If a process ($P_{xy}$) is selected at step 104, the database server 28 is notified that something is requested from its database 30 or that some processing of data is requested. For example, the data transaction assembler 18 may send a user "?" inquiry to the database server 28 so that options may be returned to the data transaction assembler 18 for presentation to the user for selection. The process triggers an external process of database server 30 with a parameter stream, and control is either returned to the data transaction assembler 18 or control is held up until the process is complete, in which case a message is sent back to the data transaction assembler 18. This message can be a report, selected data, a value resulting from a calculation, and the like. Processing such as checking detectors and the like may also be performed locally by data transaction assembler 18.

Figure 8:
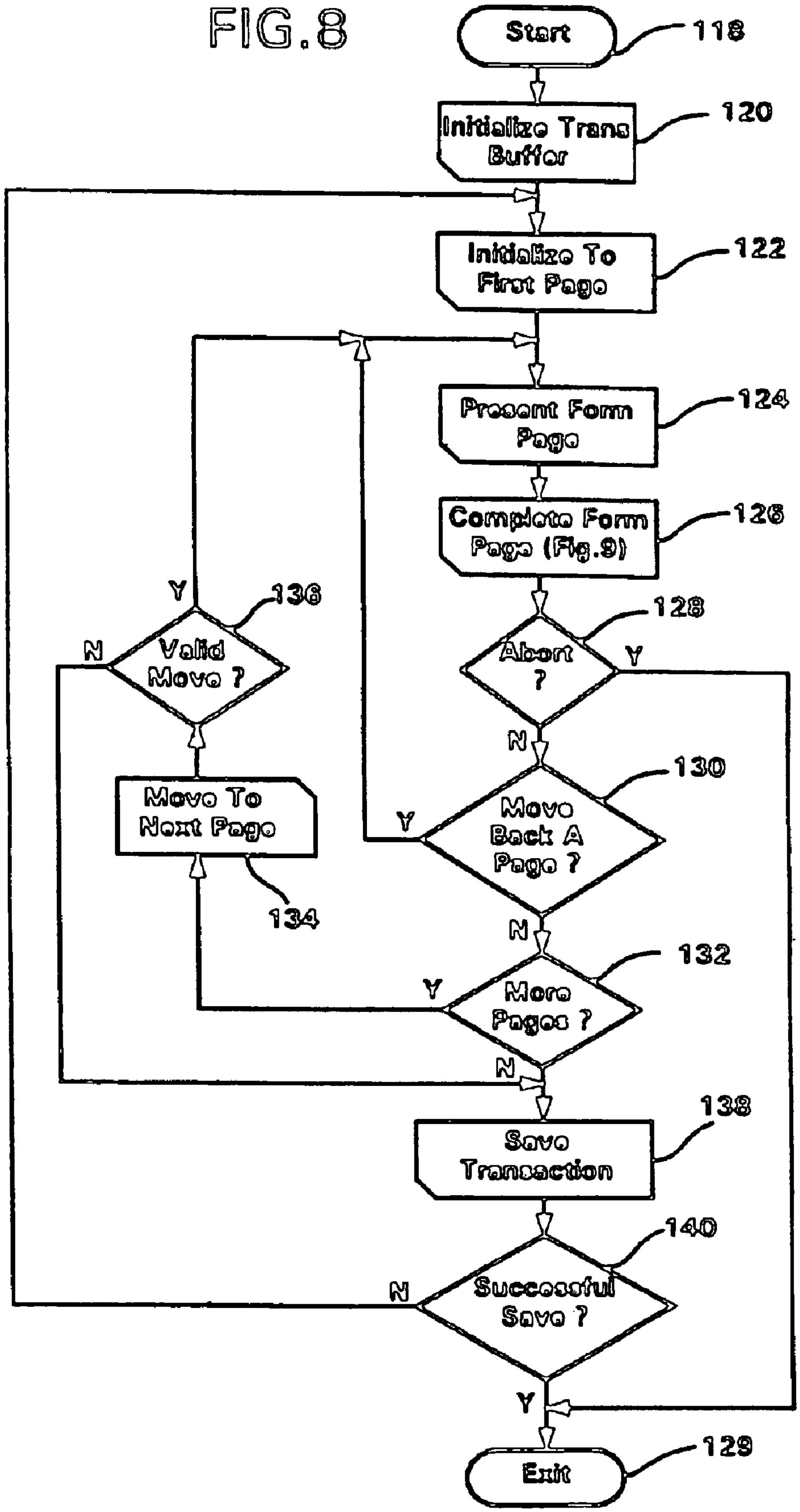
FIG. 8 is a flow diagram illustrating a technique for processing a form used to perform a data transaction in accordance with the invention.
Figure 9A:
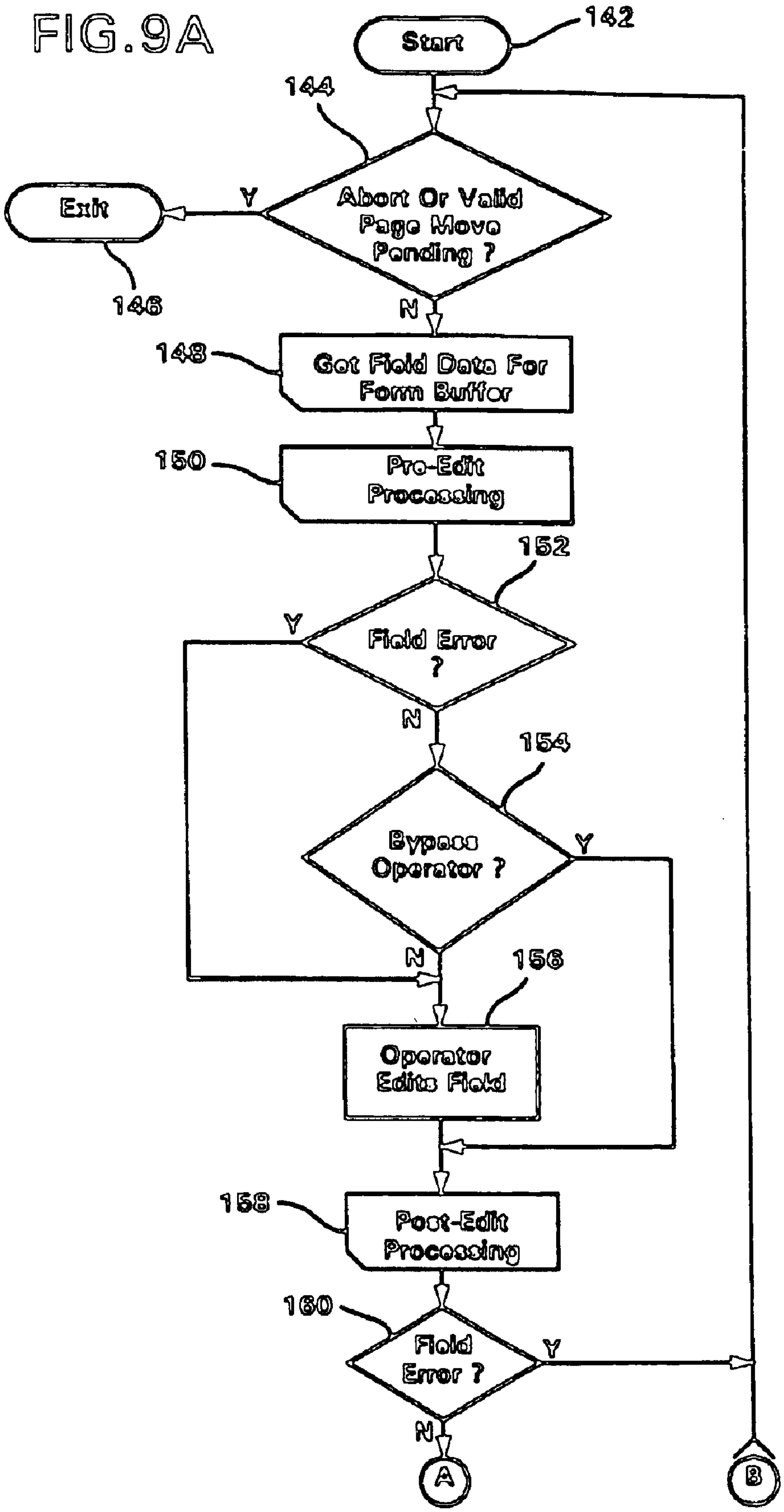
FIGS. 9A and 9B together illustrate a flow diagram of a technique for completing and editing a data transaction in accordance with the invention.
Figure 9B:
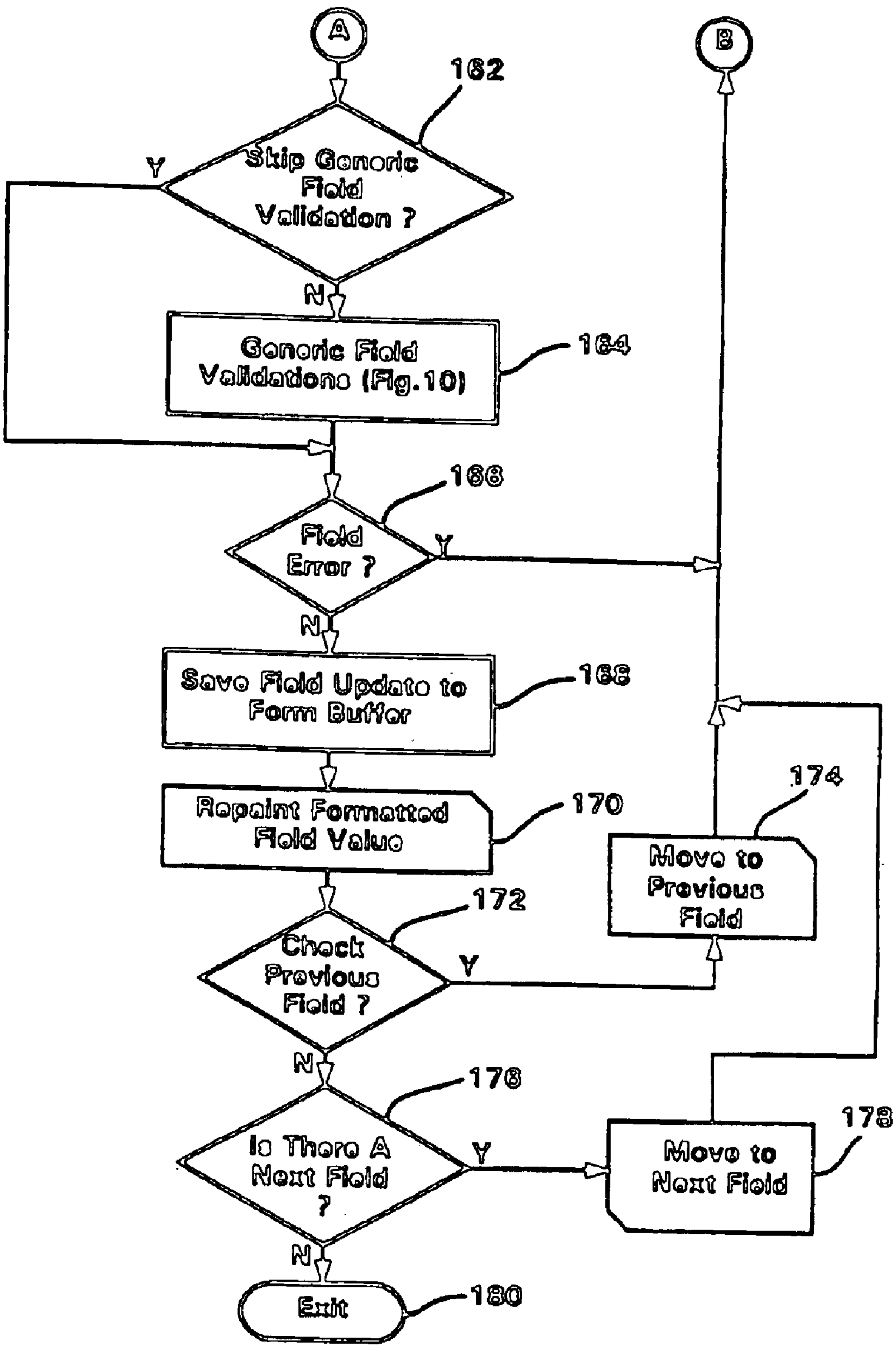
Figure 10:
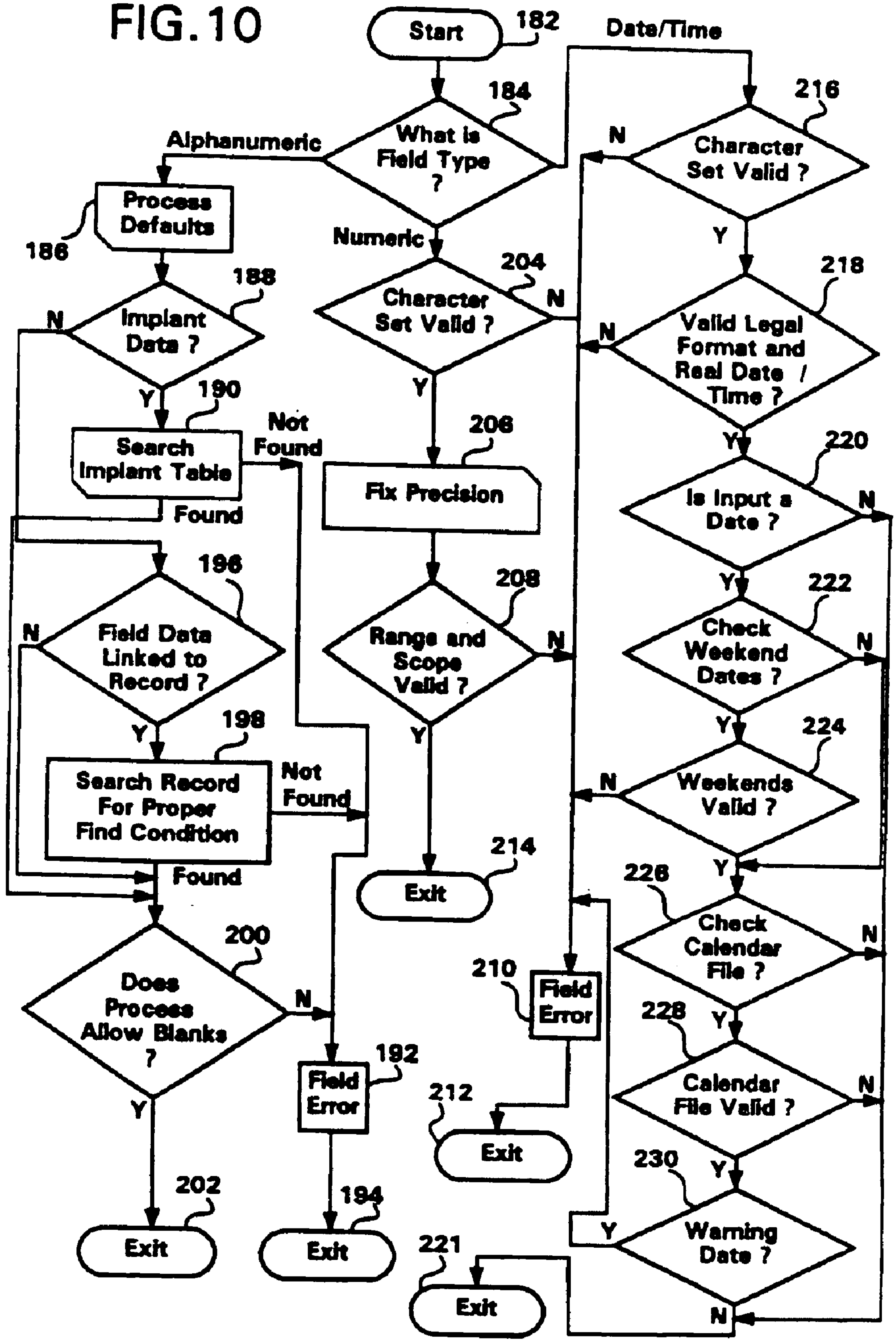
FIG. 10 is a flow diagram illustrating how the TAS validates the fields of each data transaction.

Once the desired form is selected for the user's application, the form is processed at step 110 in accordance with the steps outlined in FIGS. 8–10. As an entry is made in each field, it is automatically stored within the input buffer area of the transaction buffer 97 at its assigned location and in the dictated format. At any time, the entire form may be exited with automatic return to the menu that called it or the form can be cleared for data reentry. Once the form has been processed and transmitted to the appropriate database server(s) 28, the database server connection is terminated and the user is presented at step 112 with the last menu from which the user made his or her selection. Alternatively, the executive menu will be called up as a default menu.

If the user indicates at step 114 that he or she wishes to continue to complete a new form, control branches back to step 104 for menu selection and a new database server connection is made as appropriate. This process is repeated for each form. When no further selections are desired, the TAS firmware is exited at step 116.

FIG. 8 is a flow diagram illustrating a technique for processing a form (step 110) to create a data transaction in accordance with the invention. As illustrated, the process of FIG. 8 starts at step 118 and initializes a transaction buffer 97 at step 120 for storage of the data transaction as it is being created. In other words, if there is a form for the requested application, it is moved from form/menu memory 96 to the transaction buffer 97. If the requested form is not present in form/menu memory 96, an error message may be sent or a request may be sent to database server 28 for a download of a data stream containing the parameters for the requested form. Preferably, transaction buffer 97 is at least as large as the largest data transaction and serves as an assembly area for the data transaction. Preferably, read and write buffers are formed so that transmit and receive buffers to/from modem interface 78 are available. Of course, transaction buffer 97 may be made larger for this purpose. Once the transaction buffer 97 is initialized at step 120, the display screen 20 is cleared and the selected form is initialized to its first page at step 122. The first page is then presented to the display screen 20 at step 124. At step 126, the user completes the form page on a field by field basis using any of the data entry techniques described above and the field controls of FIGS. 9 and 10.

The transaction buffer 97 collects the data associated with the form presented to the user on display screen 20 and contains appropriate locations for each separate data element. Upon completion of the data transaction, the contents of the transaction buffer 97 are transferred to the appropriate database server(s) 28 via modem or via wireless, preceded by a set of codes (field 44, FIG. 2) which identify the type of data transaction and followed by a string of process identifiers for the database server(s) 28 to use in its programs in creating additional transactions and in storing the data and all ancillary data transactions in the regular file format of the database 30 associated with the database server(s) 28. As a result, the data transaction created in the transaction buffer 97 has a one-to-many relationship to the data stored in the database 30.

If the user decides to abort the processing of a form at any time (step 128), the form processing routine is exited at step 129. Otherwise, it is determined at step 130 whether the user wishes to go back a page (for a multi-page form) to correct a data entry. If so, control returns to step 124 for presentation of the earlier page. If the user does not wish to examine or edit a previous page, it is determined at step 132 whether the current form has another page which has not been displayed for completion by the user. If the form has more pages, the routine moves to the next page at step 134, and it is determined at step 136 whether the move to the next page was successful. If so, control returns to step 124 for presentation of the next page. Of course, the process of calling a subsequent page in a form or another form upon completion of a form can be dependent upon an automatic call of that page or form sequence or the ability to jump sequence (i.e., skip pages) depending upon a value in any one field that has been entered. In any event, if there are no more pages in the form or if the move to the next page was not successful, the end of the form is marked with a code and the transaction is saved at step 138 by sending the data transaction to the appropriate database server(s) 28 for storage in its associated database 30 and "explosion" for storage of data in other databases 40. If it is determined at step 140 that the save was not successful because of a modem error and the like, control returns to step 122 and the process is repeated. If the data transaction was successfully saved, the form processing routine is exited at step 129 and the last menu used is presented (step 112).

Optionally, stored procedures within any data transaction form (field 50, FIG. 2) are executed at the appropriate time within the flow of the form processing routine before it is exited. However, these processes may be deferred and performed by the database server 28 if needed.

FIGS. 9A and 9B together illustrate a flow diagram of a technique for completing and editing the fields of a form (step 126 of FIG. 8). The field completion routine starts at step 142 and first determines at step 144 whether an abort or a valid page move request is pending. If so, the field completion routine is exited at step 146. However, if no abort or page move request is pending, the field data for the first field of the transaction buffer 97 is entered at step 148. As noted above, this field data may be entered via keyboard 68 or touch screen 64, swiped in via magnetic card interface 70, read in from a memory card via memory card interface 89, read in via modem interface 78 from database server 28, or designated by voice entry. Pre-edit processing of the field data is then performed at step 150. Such pre-edit processing may include, for example, setting default values, performing calculations, establishing links to data in other files, looking up and writing data to files already linked to the present form, spawning another form, performing special updates of the display screen 20, hiding fields from view by the user, and the like. Such pre-edit processing may also be used to determine whether modifications or actions in the present field may invalidate an entry in another interrelated field. If so, appropriate measures are taken to update all affected fields or to prevent such problems by setting appropriate default values.

The field completion routine then checks for field errors at step 152 on the basis of the default values and the like set at step 150. If there is no field error at step 152, it is determined at step 154 whether the operator will be permitted to edit the field in the absence of a field error. If so, or if a field error was found at step 152, the operator edits the field at step 156. If the operator editing is bypassed, control proceeds directly to post-edit processing at step 158, which performs essentially the same functions as pre-edit processing step 150 except that the data may be specially validated. The field is then checked yet again at step 160 for a field error. If a field error is found at step 160, control returns to step 144 for processing the next field or exiting, as appropriate.

If no field error is found at step 160, it is determined at step 162 whether the generic field validation routine of step 164 (FIG. 10) is to be skipped. If so, control proceeds to step 166, where the field is once again checked for a field error. However, if generic field validations are desired, control passes to the routine of step 164 (FIG. 10). If no field error is found at step 166, the field is saved to the transaction buffer 97 at step 168 and the updated field value is painted on the display screen 20 at step 170. If the user then desires to check a previous field at step 172, control passes to a previous field at step 174 and the field completion routine is repeated for the previous field. However, if no previous field is to be checked and if it is determined at step 176 that a further field is present, control passes to the next field at step 178 and the field completion routine is repeated for the next field. This process repeats until the last field is completed and the routine exits at step 180. Control then returns to FIG. 8 for processing a different page of the form.

Each form may be processed in one or more modes. In the input mode, described above, the data transaction is created and transmitted to the database server 28. However, in edit mode, upon entering the ID of a particular record, that record is read from an external database 30 or 40 into transaction buffer 97 for editing. Preferably, a record of the edits is maintained to provide an audit trail. In view mode, upon entering the ID of a particular record, that record is similarly read from an external database 30 or 40 into transaction buffer 97 but for display only. Finally, in delete mode, an entire record can be deleted from the database 30 or 40 if the user has proper security clearance.

FIG. 10 illustrates how the TAS firmware validates the fields of each data transaction. As shown, the field validation routine starts at step 182 and first determines at step 184 what field type is present. If the present field is an alphanumeric field, control passes to step 186 where the field defaults are processed. It is then determined at step 188 whether the user knows the values allowed for this field. If not, and data is to be implanted in that field, an implant table is searched at step 190. A "?" may be used by the operator to indicated that he or she does not know the values allowed for this field and wishes to search the implant table. A list of possible values are then called up that match the data entered thus far. From this list, the operator can scroll the list and select the value that will complete the data entry. However, if the value is not found in the list, a field error is generated at step 192 and the field validation routine is exited at step 194. If the value is found in the list, control passes to step 200.

On the other hand, if at step 188 it is determined that data need not be added (implanted) into the present field, control skips to step 196, where it is determined whether the present field type is a field which sets up an event in which the present field (along with its form) can be linked to any record of any file or files (one to many) of any database for the purpose of data verification and/or data extraction. If so, control passes to step 198, where the data from the present field along with any other data previously gathered is used to make the desired link. As in the data implant step 188 noted above, the user may enter a "?" to get the information needed to make this link. If the data for the link is not found, a field error is issued at step 192 and the field validation routine is exited at step 194. However, if the data for the link is found, the field is checked for blanks at step 200 and a field error is issued at step 192 if blanks are present in the field but are not allowed. If no blanks are found in the present field, or if blanks are found but are allowed, the field validation routine is exited at step 202.

If it is determined at step 184 that the present field is a numeric field, the field is checked at step 204 to determine if the character set is valid. If so, the precision of the numbers is adjusted at step 206, as necessary, and the range and scope of the numbers are checked at step 208 to make sure the field entries satisfy the boundary conditions (e.g., no dividing by zero). If the character set is not valid at step 204 or the range and scope of the numerals is not valid at step 208, a field error is issued at step 210 and the data validation routine is exited at step 212. Otherwise, the field validation routine is exited at step 214.

If it is determined at step 184 that the present field is a date/time field, the field is checked at step 216 to determine if the character set is valid. If not, a field error is issued at step 210 and the field validation routine is exited at step 212. Otherwise, a routine of the TAS firmware checks the date/time entry at step 218 to determine if it has the correct format by performing range checking and the like. If the date/time entry does not have the correct format, a field error is issued at step 210 and the field validation routine is exited at step 212. Otherwise, it is determined at step 220 whether the present field contains a date. If not, the data validation routine is exited at step 221. If so, the date is checked at step 222 so see if it contains a weekend, and, if so, checks at step 224 whether a weekend date is an acceptable reply for this field. It is then determined at step 226 whether the calendar file is to be checked, and if so, the calendar file is checked at step 228 to see if the date is valid (e.g., not a February 30 and the like). Finally, it is determined at step 230 whether a warning date has been exceeded, and if so, a field error is issued at step 210 before the field validation routine is exited at step 212. Otherwise, the field validation routine is exited at step 221.

Those skilled in the art will appreciate that, in order to maintain security, the TAS firmware may also present a security form for password entry to the user. The security form and ID of the transaction entry device 12 is then encrypted and transmitted to the database server 28 associated with the particular data transaction assembler 18. Transaction controller 36 of that database server 28 will then act as the transaction controller for that data transaction assembler 18 and will check passwords and the like during operation to make certain that data security is not breached. Database servers 28 may disable a data transaction assembler 18 if unauthorized use is attempted. In this manner, only the appropriate person may view each menu. Of course, a different number of security levels and different executive menus may be presented as desired, all under control of the transaction controller 36.

4. Database Server 28

As noted above, the database server 28 acts as a vehicle for separating data transactions created by the data transaction assembler 18 into the component parts thereof which may be stored directly in one or more databases 30 and 40. In other words, the database server 28 explodes the initial data transaction into data transactions for many different files for updating records in the files, and the like. Also, the database server 28 may be virtual as well as real, exist in a single machine or in multiple machines, in whole or in part.

Generally, the database server 28 handles any and all data transactions received, manipulates data in the data transactions, spawns or starts processes or reports requested by a data transaction, and explodes the received data transactions into all sorts of data transactions that were spawned by the initial data transaction. Database server 28 can also update values in existing records and can switch to a process for processing values in the records as necessary. In this manner, a single data transaction can define actions causing multiple files to be updated. Database server 30 also handles requests from the data transaction assembler 18 and processes them as needed. Such requests may include data I/O requests, data locking and unlocking, report processes, and requests for new forms or menus. Those skilled in the art will appreciate that database server 28 maintains the oneto-many relationships that exist between the user and the system of the invention, the one-to-many presentations to the user and files in the databases 30 and 40, and the one-to-many data transactions and the ancillary records, updates, and postings as may be required to diverse computer files of numerous databases 40, the transaction entry device 12 and the database servers 28.

As noted above, transaction buffer 97 collects the transaction data associated with the form presented to the user via display screen 20. The transaction buffer 97 is the image of the data transaction with appropriate locations for each separate data element. The contents of the transaction buffer 97 are transferred to the database server 28 via modem interface 78 or via RF transceiver 90, preceded by a set of codes 44 (FIG. 2) which identify the type of transaction followed by a string of process identifiers for the database server 28 to use in its programs, in creating additional data transactions, and in storing the data and all ancillary transactions within the database 30 in the regular file format of the database 30. In other words, the database server 28 determines what type of action to take based on the type of data transaction received, "explodes" a data transaction into a plurality of other data transactions for transmission to other databases, as appropriate, and converts the data for its associated database 30 into the proper file format. Of course, each database server 28 is different from each other database server 28 since it will handle different types of data transactions, have different operating system characteristics, and different file conversions to make in accordance with the file formats of its associated database 30. For example, the database server 28 may operate under an operating system such as Unix, Windows, or DOS, where the operating system provides the database server 28 with links to the hardware functions normally handled by an operating system. Preferably, the database server 28 also operates with menus, forms, and the like in the same fashion as the data transaction assembler 18 except that it stores the data transactions in its associated database 30 as transaction files.

As just noted, the purpose of the database server 28 is to process the data transaction from the data transaction assembler 18 and to either explode the data transaction into all of its related components for storage, to handle the storage of items from the explosion process, to store the data transaction itself for reference purposes, and to act as a supplier of information to the data transaction assembler 18 in response to requests during the creation of the data transaction and during the downloading of parameters for menus and forms to the data transaction assembler 18. If desired, the database server 28 can also supply information back to the data transaction assembler 18 after a data transaction is received or can initiate a process leading to the delivery of a report, data, or menu to the data transaction assembler 18. In addition, the database server 28 and data transaction assembler 18 can reside on the same machine so long as the database server's operating system recognizes the TAS firmware or the TAS firmware is modified for use with the operating system of the database server 28.

5. Applications of the First Embodiment of the Invention

As outlined above, the present invention includes a point of transaction device that presents a menu to a user from which an option is selected. A form tailored to the selected option appears for guiding the user through data entry. The full details of the data transaction are captured as data is entered by the user. Modem interaction with a central database(s) or a user database(s) allows for interaction for help and verification of certain entered data. The completed transaction is then transmitted to the central or user database for further processing and storage. Data input can also be provided via a swipe card or smart card, from data received from any database accessible via the modem interface, or other known methods.

A data transaction system of this type may be used for many applications. For example, in a first, presently preferred, application, the transaction entry device 12 is located in a medical office for entry of patient data. In this application, a swipe card identifies the patient, a smart card identifies the doctor, and the modem connection allows the entire claim transaction to be entered and transmitted to the insurance companies for processing. The patient records may also be automatically updated and prescriptions created, given to the patient, transmitted to the pharmacist, and transmitted to the payor and patient record. Patient instructions such as special diets, exercises, treatments, appointments and the like may be printed from the data transaction form at the doctor's central computer. In addition, a video image or picture provided via video input 74 and compressed by data compression circuitry 75 permits an image of a medical condition such as a rash to be appended to the data transaction (in miscellaneous processing field 50 of FIG. 2) for transmission with the patient's name, the date, a description of patient symptoms, and the like. Similarly, a recorded heartbeat may be appended to the end of the data transaction for transmission with the patient data The data transaction entry system of the invention also has numerous home uses. In a preferred home use, the transaction entry device is used for performing bank transactions from the home. In this case, forms would be made available by the bank for different types of bank transactions. These forms would then be downloaded to the transaction entry device in the customer's home and used in creating and transmitting data transactions to the bank computer for off-line processing.

As another example, the user may dial-up to a 900 number to get an interface to a central database which will download codes into TAS PROM 95 or form/menu memory 96 which enable the generation of infrared signals at certain frequencies. The user needs only to specify the type, make and model of any electronic device to be controlled in order to get the desired code. Then, to operate any electronic device in the home, the user would be directed by menu prompts. The transaction entry device 12 would then emit an infrared signal via infrared transceiver(s) 80 to operate the electronic device, initiate a call via modem for a broadcast program, or initiate timed requests for video recording, turning the video recorder on and off, and the like.

For other home uses, the transaction entry device 12 may also initiate, via menu prompts, sequences for turning on and off various household devices including alarm systems, coffeemakers, and the like. In this mode, the transaction entry device 12 may receive an RF or infrared signal indicating that a burglar or fire alarm has been activated and call up a form for calling the police or fire department, as appropriate. A call to the transaction entry device 12 may then be used to turn off the burglar or fire alarm by changing a field in a form which instructs the infrared transceiver 80 or RF transceiver 90 to send an appropriate control signal to the alarm device. This feature may also be prompted from a car phone via remote initiation of the form performing this function.

The transaction entry device 12 may also control all household telephone use as well as controlling the answering machine and keeping a telephone transaction log. The user may also pay household bills by completing an appropriate form and transmitting the form to a payee such as a credit card company, a bank, and the like. In short, the transaction, entry device will permit the owner to connect to a remote database without owning a conventional computer system with an operating system and the like.

For personal applications, the transaction entry device 12 may be used to initiate a facsimile transmission, to provide telephone lists with automatic dialing upon selection, to provide expense accounts, personal scheduling, tax record keeping, and the like, and to provide direct access to travel information. For example, the database server 28 may be an airline reservations system. In this application, the data transaction assembler 18 dials the modem of the airline reservations system when the user requests data entry into an airline reservations form available at the user's transaction entry device 12. The data transaction device 18 modems the database server 28, and the operating system of the database server 28 selects interface programs for the airline reservations system. The interface programs call the database servers 38 of the airlines, retrieve the appropriate menu from database 40, and modem the menu to the data transaction assembler 18. The data transaction assembler 18 then displays the airline reservations menu on its display screen 20 for completion and transmission back to the airline reservations database server for processing. The swipe card may be used to provide credit card payment information and may be updated by permitting the data transaction assembler 18 to write to the swipe card. The user may also access frequent flyer club and mileage data, special offers on hotels, cruises and other travel, and the like.

In another home (or business) use, the transaction entry device 12 may be used to eliminate conventional phone mail greetings by enabling the caller's transaction entry device 12 to read in a set of visible menus from the called party's voice mail menu so that the calling party may select the desired options using a visible menu rather than a voiced menu. In other words, the caller would not have to wait through the litany of voiced phone mail options before making a selection and could make the desired selection right off of his or her own display. This would be accomplished by selecting a process from the menu of the transaction entry device 12 that will create a "visible" menu. When such a process is selected, the telephone electronics 14 or modem interface 78 makes a telephone connection to a remote phone mail system. Once the connection is made, the data transaction assembler 18 sends a data request for a visual representation of the phone mail menu of the remote phone mail system via the telephone connection to the remote phone mail system. A data stream containing the visual representation of the phone mail menu from the remote phone mail system is then returned via the telephone connection and stored in form/menu memory 96 and presented to display screen 20 of the transaction entry device 12 for selection using the techniques described herein. When menu items are selected from the "visible" voice mail menu, the data transaction assembler 18 creates a data transaction indicating which menu item was selected and sends the data transaction to the remote phone mail system via the telephone connection. Based on the menu selection, the remote phone mail system then returns a data stream containing a visual representation of the next phone mail menu via the telephone connection for storage in form/menu memory 96 and display on display screen 20. This process is repeated until the calling party is required to leave a message or the called party is reached. Normal voice communications would then ensue. Such a system would be particularly helpful for interacting with voice mail systems, such as those at government offices, where numerous options are presented for selection.

6. Client Device Transaction or Form-Driven System—A Second Embodiment

Figure 11A:
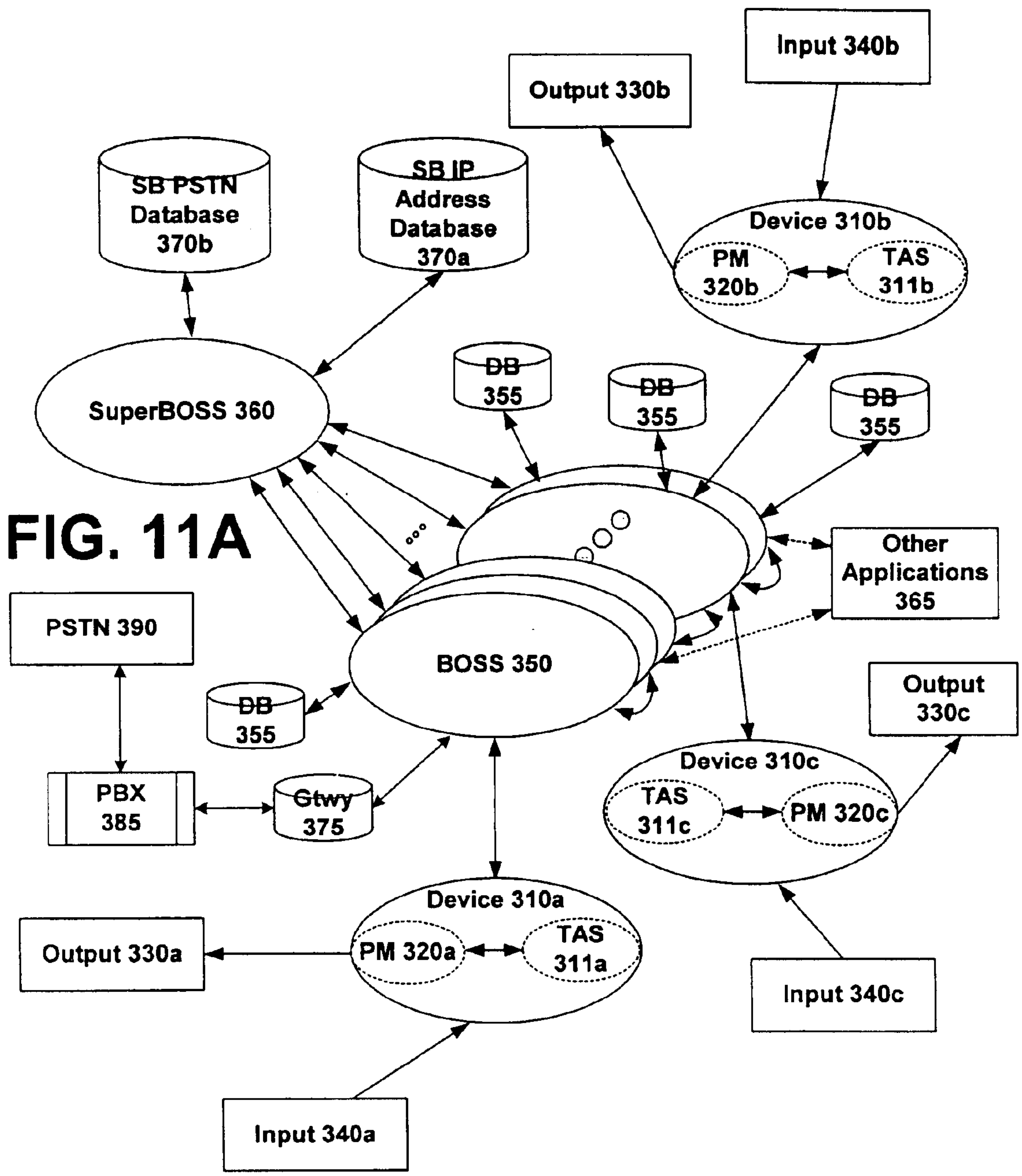
FIG. 11A is a block diagram generally illustrating a form-driven computer system in which a second embodiment of the present invention may be implemented.

FIG. 11A is a block diagram generally illustrating an exemplary form-driven computer system in which the present invention may be implemented. As noted previously, such a system is one in which tabular, listed, menu, form, report, message or other modular information is presented, transmitted from and received by a client device having a form-driven operating system tailored to such functionality; however, it will be appreciated that a system may include, for example, the functionality of another operating system into a client device 310 for piecemeal use of extra functionality, such as video conferencing, voice processing, and other specialized applications. Also, any one of a variety of devices 310, such as device 310*a*, 310*b*, 310*c*, etc. may have a transaction application server (TAS) 311, such as TAS 311*a*, 311*b*, 311*c*, etc. and presentation manager 320 stored thereon.

As described in detail in the aforementioned commonly assigned applications and in connection with the first embodiment of the present invention, a TAS 311 is a form or panel driven data interfacing object for handling basic form processing, input and output functions and TAS 311 may be implemented in software, hardware or a combination of both. Each device 310 has an output device 330 for displaying form data to a user, and an input device 340 for inputting form data. Presentation managers 320*a*, 320*b*, 320*c*, etc. present form data and are capable of push techniques wherein data, such as form data, is pushed to an output device 330. The presentation of data may be in visual or audio form, and the visual form is at least one of a different language, voice, menu, form, audio, video, tabular information, textual information and graphic information, or a combination thereof.

These devices may be of any kind so long as they contain a microprocessor to control TAS 311 and presentation manager 320, a display for presentation of data to a user and a device for receiving, sending and entering data streams. The screens may be at least partly touch screens. Communications for a devices 310 may be via wired, wireless, infra-red, radio frequency of high power, radio frequency of low power, laser, pulsed transmissions or a combination thereof and may be made via a network including at least one of telephone circuits, private networks, intemet, LANs, WANs, frames, virtual private networks, public branch exchange (PBX), Internet protocol public branch exchange (IPPBX), and voice over internet protocol (VOIP). Communications may include securing and authenticating techniques from or to the client device 310. Example devices include screen phones, handheld devices, PCs, pocket PCs, and other communication devices. Data communications to a client device from BOSS software controlled computers 350 include fields for storing parameters for use with determining the appropriate data response from the client device. These fields may be of fixed or variable length and may be modified dynamically. Thus, a voice data stream needing a voice response may have a field embedded in or appended to the voice data stream whereby the field never changes for the voice data stream. A voice data stream needing one of a voice or text response may have a variable field associated with the voice data stream so that voice or text may be specified. A field of a data stream may also be changed dynamically to represent another characteristic of the associated data stream or to elaborate upon or reduce the data stream response criteria. Any one of the system components such as BOSS software controlled computers 350, other applications 365, databases 355, other client devices 310, etc. may store, generate, remove, add, alter or otherwise process the fields of a data stream according to the present invention to accommodate a dynamic description of what is required in response to data that has arrived at a client device 310. Thus, for example, voice data delivered to a client device 310 may have a field associated therewith that specifies the restrictions for a valid response from the client device 310. For instance, voice data might demand that voice or text data be returned from the client device 310, and a field may be associated with the voice data for this purpose.

Broad operations system server (BOSS) software controls a computer 350 for handling processing, reception and transmission of form data or system data from or to databases 355 for storage or retrieval of data, SuperBOSS 360, further applications 365 and other BOSS software controlled computers 350. Such data transmission can represent data, voice, video, etc. and may be encrypted for security. SuperBOSS 360 may function as a locator of BOSS software controlled computers 350 for various requests from client devices 310. SuperBOSS 360 also communicates with SuperBOSS databases 370, e.g., 370*a* and 370*b*, for network specific identification information.

In the case of a telephone network, this information may be public switched telephone network (PSTN) numbers or IP addresses stored in database 370*b*. In the case of the Internet or other network utilizing IP address numbers or other identification information, a database 370*a* may have stored therein IP address information. In short, databases 370 may store any information that is communications network specific in order to function as a locator for BOSS software controlled computers 350, and the system generally. Hence, the dynamic IP or switched network numbers may be established dynamically and messages may be sent or pushed to any user anywhere once the user has logged in or otherwise initiated a session with a client device 310. After initiating a session (by e.g., making a phone call or powering the device) or logging in, the IP address is sent to SuperBOSS 360 after verification of "membership." Membership can be permanent or temporary, e.g., a one time use. It should be emphasized that SuperBOSS 360 may function as both a static and dynamic locator. As a static locator, a user's "registered" client device 310 has identification information that does not change, and information may be delivered or received from a user at that client device 310. A user may also change his or her location and/or client device 310. Accordingly, by way of the locating functions of SuperBOSS 360, the system needs to accommodate users' changes in location, and further accommodate a user's requests for deliveries to other authorized client computers. This is achieved by dynamically locating users and client devices so that data reaches the right destination. Thus, SuperBOSS 360 serves as both a static and dynamic locator.

Although software for SuperBOSS 360 may be provided separately, in a presently preferred embodiment, preferably, SuperBOSS 360's functions are provided as a part of the BOSS software package which may be loaded onto any computer, but for conceptual purposes in FIG. 11A, the SuperBOSS 360 has been shown as separately located. Thus, any BOSS software controlled computer 350 may have the functionality of SuperBOSS 360 incorporated therein. As used herein, locator/SuperBOSS 360 refers either to the software for performing locating functions in accordance with the present invention or to the hardware, such as a computer, embodying the software for performing the locating functions.

These functions contribute to BOSS software controlled computers 350 capabilities to act as the following: as a pass through/conduit for a transaction from a client device 310 to application(s) 365 or databases 355, as a router to the locator system including locator/SuperBOSS 360, as a pusher of any type of data such as voice data to a client device 310 e.g., from another client device 310 or application 365, as a pusher of new or updated software to a client device 310 or another part of the system, as a link between different client devices 310, as a vehicle for encrypted, secure authenticated communications, as a router to other BOSS software controlled services, and as a decoder or encoder of encrypted communications including the processing of encryption keys. Thus, for instance, a BOSS software controlled computer 350 may link to other BOSS software controlled computers 350, serve as a connector from TAS 311*a* to TAS 311*b* e.g., forward a message, and connect a TAS 311 to needed applications 365 or databases 355.

A BOSS software controlled computer 350 may be also connected to a gateway 375 for connection to a private branch exchange (PBX) 385. Thus, telephone network infrastructure is incorporated into the present invention. This is advantageous because, for example, long distance tolls may be avoided or reduced by routing long distance calls over the Internet and then passing the data back to local PSTNs 390 via gateways 375 and PBXs 385.

It should be understood that a client computer having a form-driven or panel-driven TAS 311 in accordance with the present invention may be any one or more of a variety of computer platforms. For example, computer platforms may include any of various handheld devices, screen phones, personal computers, devices with a telecommunications device integrated with data storage and processing capabilities of a computer and any computer that advantageously utilizes or is capable of form-driven input and output. A form-driven system is suited to the retrieval of form information for the presentation of forms (panels built from panel definitions) and also suited to the reception, transmission and further processing of input form data (user input e.g., filling out the form or panel). The form or panel data that is presented on an output device 330 may be referred to as a presentation. Presentations can be visual data, graphic images, video or speech visualization or speech sound.

Any one of various data security techniques may be utilized with the storage and communication of data in accordance with the present invention. For example, any number of well known encryption algorithms may be utilized for the secure transmission of data. Hopping algorithms, for example, ensure that the decryption key is not the same from one decryption to the next. Secure memory with authentication integrated circuits may substitute for conventional memory to provide an even greater level of security. A variety of security approaches have thus far been taken in connection with secure on-line transactions, and may be utilized with security measures for communications of the present invention.

It will also be appreciated that there is a wide range of authentication techniques suited to supplementing the secure transmission of data. Various user or device authentication techniques include the use of complex handshaking between devices, fingerprinting, iris scanning, key cards, cards with magnetic strips, magnetic cards, micro-chip cards, techniques for physical authentication including, but not limited to one or more of password, iris scan, retina scan, fingerprint, voice signature, physical appearance, or combinations of body signals and signs, and so on. Additionally, security levels may be layered according to the sensitivity of the data, user access levels, etc. Any one or more of authentication techniques may thus be used to supplement techniques for secure transmission providing robust level(s) of security for the form-driven system of the present invention. The security techniques described here may also be implemented in connection with the first embodiment described above.

In a presently preferred embodiment, encryption and authentication software encrypts each form and its associated data and applies authentication techniques to at least one of a user and a system component to provide an additional layer of security. Authentication techniques may utilize a magnetic card, a micro-chip card, techniques for physical authentication. Physical authentication may include one or more of passwords, iris scans, retina scans, fingerprints, voice signatures, physical appearances, body signals and signs or other authentication techniques.

Figure 11B:
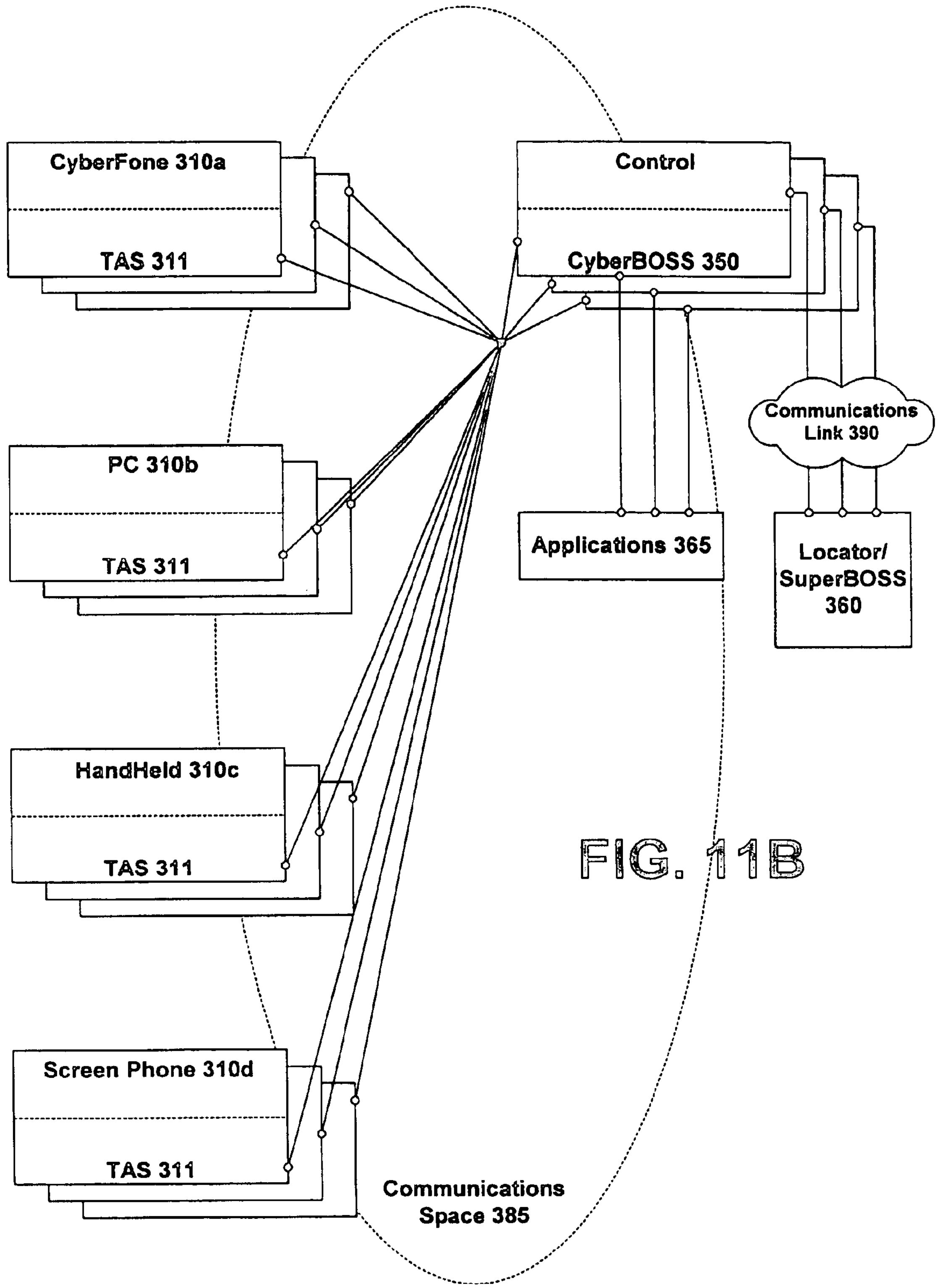
FIG. 11B is a block diagram generally illustrating an exemplary system set of devices for use in connection with the second embodiment of the present invention.

FIG. 11B is a block diagram generally illustrating an exemplary system set of devices in connection with which the present invention may be implemented. As mentioned, devices 310 may be a Cyberfone™ 310*a*, PC (personal computer) 310*b*, handheld device 310*c*, a screen phone 310*d*, or any device suited to the inclusion of a TAS 311 and presentation manager 320 in accordance with the present invention. Devices 310 communicate with BOSS software controlled computers 350. When a user initiates a session, e.g., by logging on, with a device 310, e.g., a PC 310*b*, a user verification process takes place. If the user is valid, message data resident in the system may immediately be pushed to that user. This message data can indicate anything, from medical information to a wedding notification, any data that the user has previously requested, and the like.

After initiating a session with a client device 310, e.g., by making a phone call or logging onto a client device 310, a user may request a task that is forwarded to a BOSS software controlled computer 350. BOSS software controlled computers 350 may communicate with applications 365 or databases 355 in order to complete a task, and/or to cause other tasks to occur in response such as pushing message data to another user. Locator/SuperBOSS 360, as explained previously, communicates with BOSS software controlled computers 350 via communications link 390 to assist or help BOSS software controlled computers 350 determine which client devices 310 are associated with which other BOSS software controlled computers 350 so as to route information properly. In doing so, the PSTN numbers and/or IP addresses for a client device 310 are stored. A client device 310 may have a plurality of connections to the communications space 385 of the present system. For example, telephone network connections may be established via modems, and other types of network connections may be established via an EtherNet card or the like. Other options include various connections to wireless communication links, LANs, WANS, etc. Communications space 385 is thus an abstraction representing the communications between devices 310 and BOSS software controlled computers 350.

From the perspective of BOSS software controlled computer 350, after receiving a kernel of data from an associated client device 310, a determination is made regarding the data's distribution channels i.e., where the data belongs, how it should be further processed, expanded or exploded to other BOSS software controlled computers 350, other applications 365 or databases 355. Generally, a kernel of data will include any one or more of voice, picture, video stream, or other digital stream of data As noted previously, a BOSS software controlled computers' 350 capabilities to act as a pass through/conduit for a transaction from a client device 310 to application(s) 365 or databases 355, as a router to the locator system including locator/SuperBOSS 360, as a pusher of any type of data to a client device 310, as a pusher of new or updated software to a client device 310 or another part of the system, as a link between different client devices 310, as a vehicle for encrypted, secure authenticated communications, as a router to other BOSS software controlled services, and as a decoder or encoder of encrypted communications. Locator/SuperBOSS 360 may aid in these processes, as described in various aspects below. By keeping track of devices 310 and where users are and where they are registered, locator/SuperBOSS 360 helps to efficiently route data to the appropriate client device 310.

TAS 311 of a client device 310 also has several overall functions including making a request for a form, either internally or from a BOSS software controlled computer 350. A form, for example, may be requested by TAS 311 in connection with a menu displayed to the user of the device 310. TAS 311 may present a menu to the user of the device 310. A TAS 311 may receive, process and display a report i.e., a subset of data for use in the form being filled out by a user. Also, TAS 311 may carry out various processes, such as finding another user, pushing a message or other data to another user, pushing data to a subset of other members, etc. Thus, once a user logs on to or otherwise initiates a session with a client device 310, the client device's location and history may be known and the user that has logged on is known. Consequently, if any messages are ready to be pushed to the user, they may be pushed after user session initiation (such as a login). Also, all of the various functionality of a telephone such as call forwarding and the like may be implemented. For example, a user may make a request for messages to go to a secondary client device temporarily.

Figure 12:
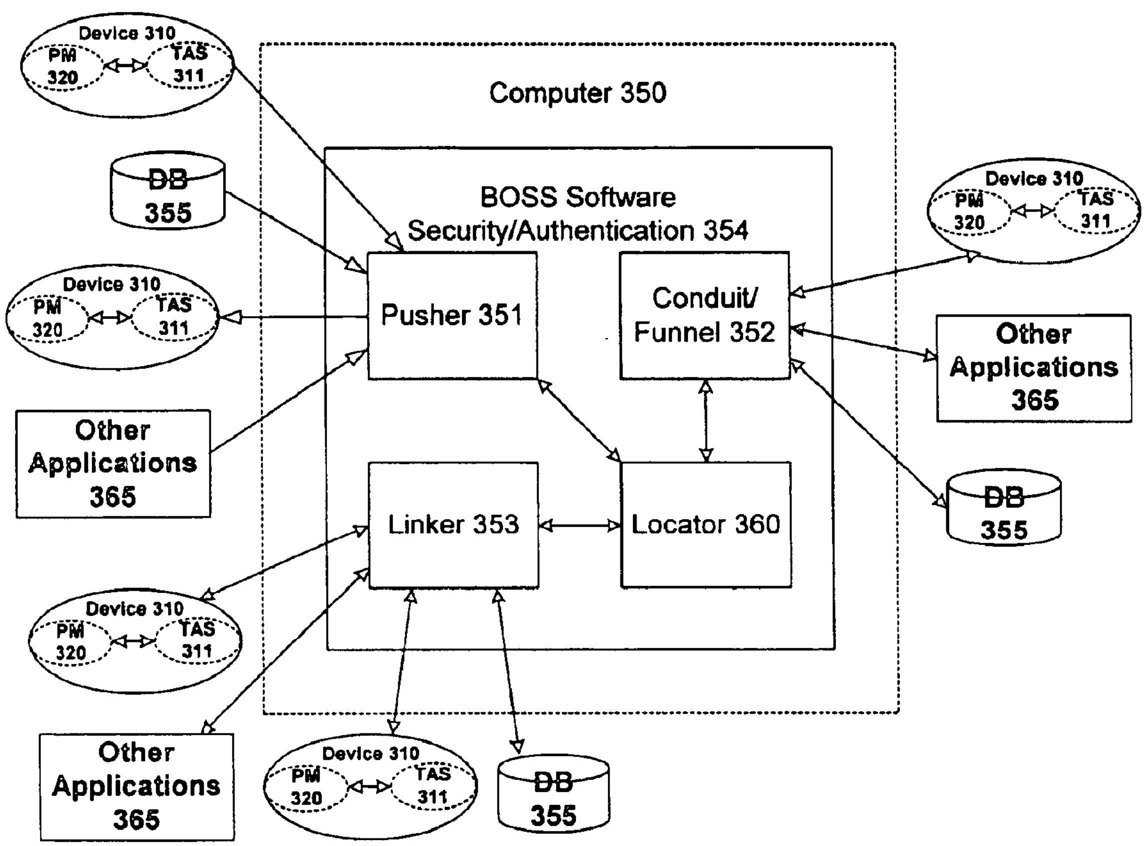
FIG. 12 is a block diagram illustrating functions of broad operations system server (BOSS) software in accordance with the second embodiment of the present invention.

FIG. 12 illustrates general functions of BOSS software. As mentioned previously, locator/SuperBOSS 360 may be incorporated into the BOSS software for performing the locating functions of the present invention. BOSS software controlled computer 350 may act as a conduit or router 352 for information to/from devices 310, other applications 365, databases 355 or locator/SuperBOSS 360. BOSS software controlled computer 350 may also operate as a pusher 351 of any type of data such as voice data to a client device 310, e.g., from another client device 310, application 365 or database 355. Locator/SuperBOSS 360 assists in this endeavor by locating the appropriate system components for delivery of the information such as the appropriate BOSS software controlled computer for the delivery of a voice message. BOSS software controlled computer 350 may also operate as a pusher of new or updated software to a client device 310 or another part of the system. BOSS software controlled computer 350 may also act as a linker/router 353 between different client devices 310, other applications 365, databases 355, locator/SuperBOSS 360 and/or other BOSS software controlled services. BOSS software controlled computer 350 may also have a secure/authenticated communications vehicle 354 for performing authentication operations for communications and for decoding or encoding communications. The vehicle 354 operates as a shroud over the communications of the system of the present invention and as such provides for encrypted, secure authenticated communications.

Figure 13A:
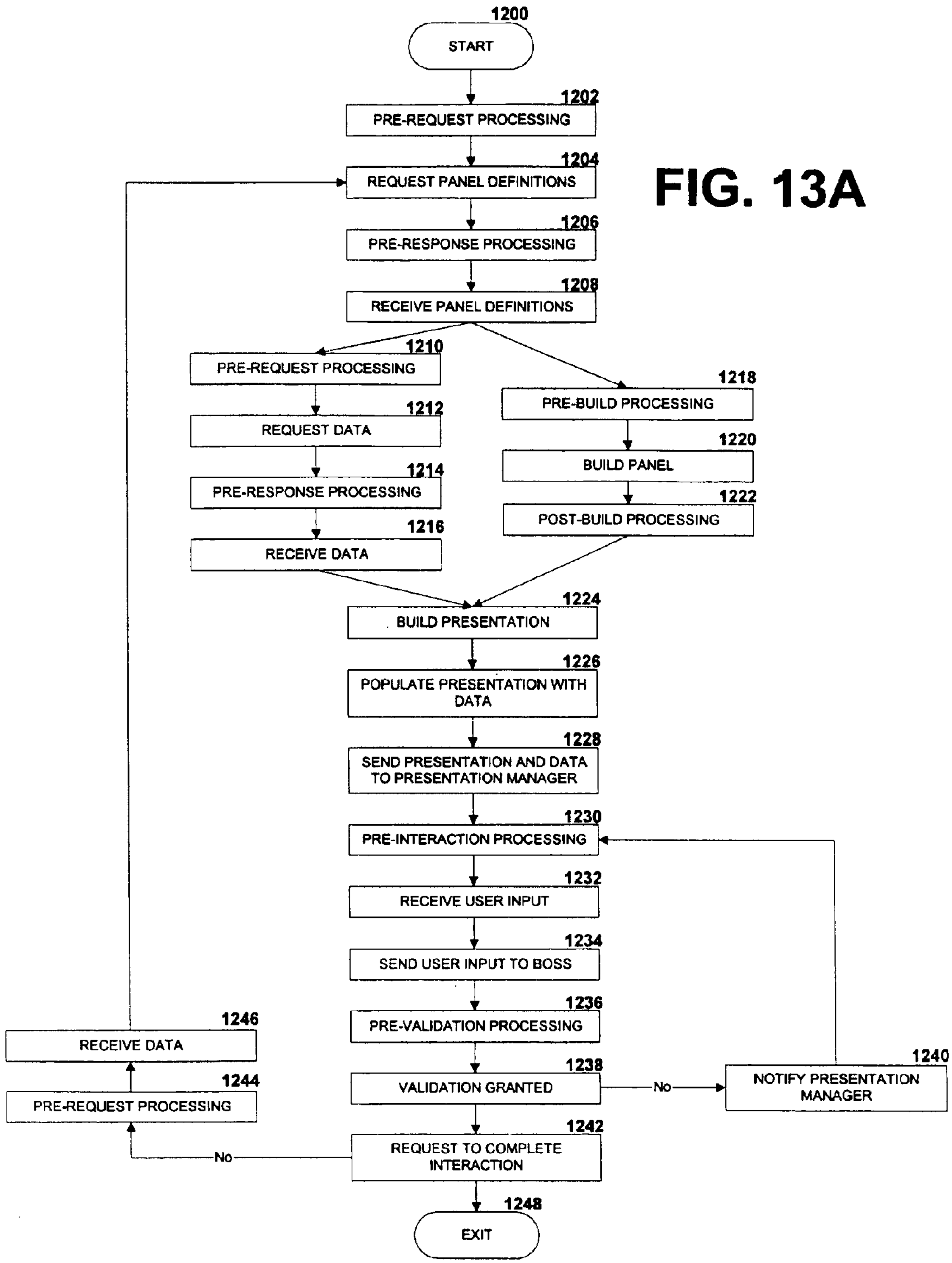
FIGS. 13A through 13C are flow diagrams of exemplary communications between a BOSS software controlled computer and a client computer having a transaction application server (TAS) and a presentation manager (PM) in accordance with the second embodiment of the present invention.
Figure 13B:
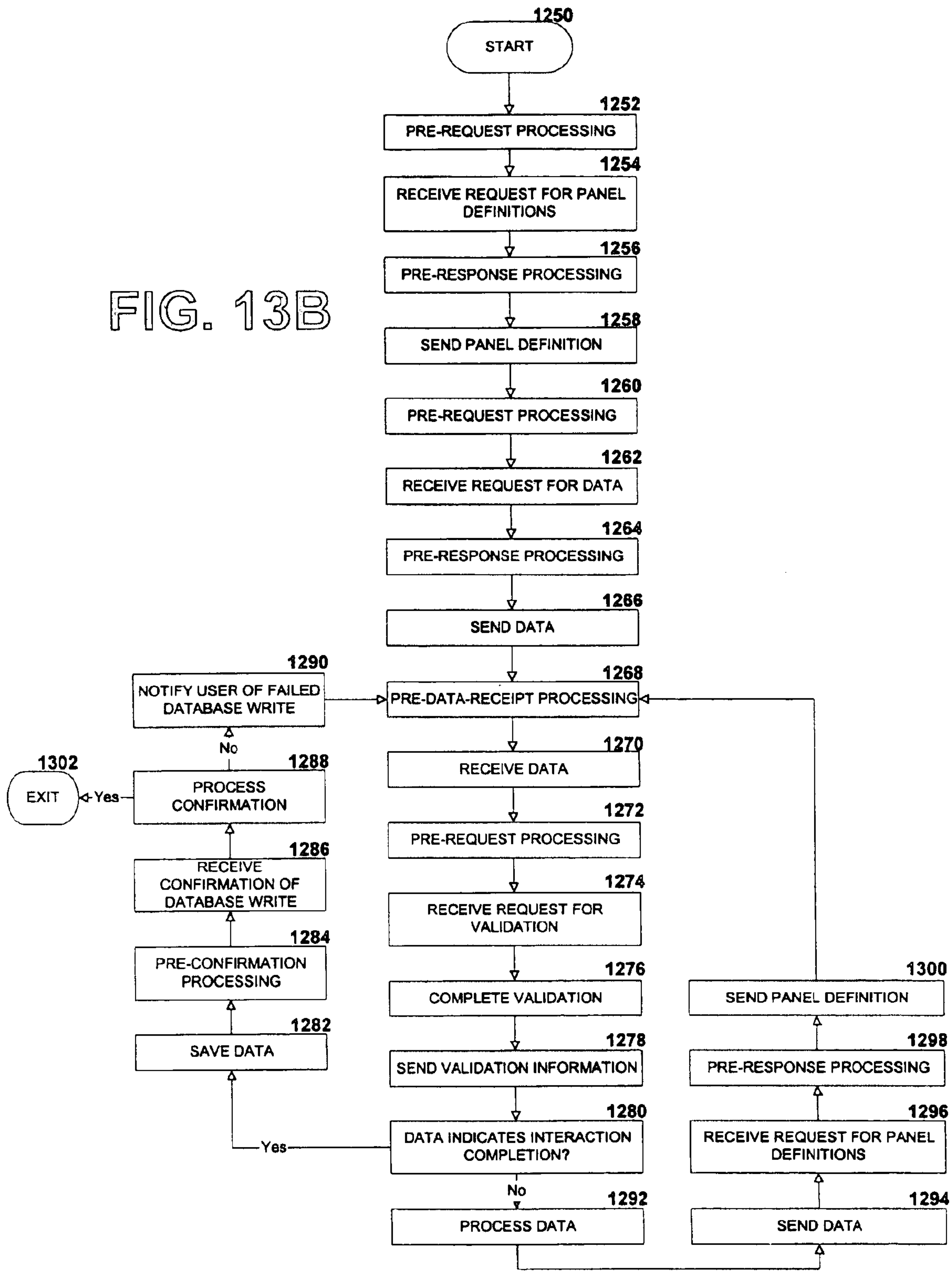
Figure 13C:
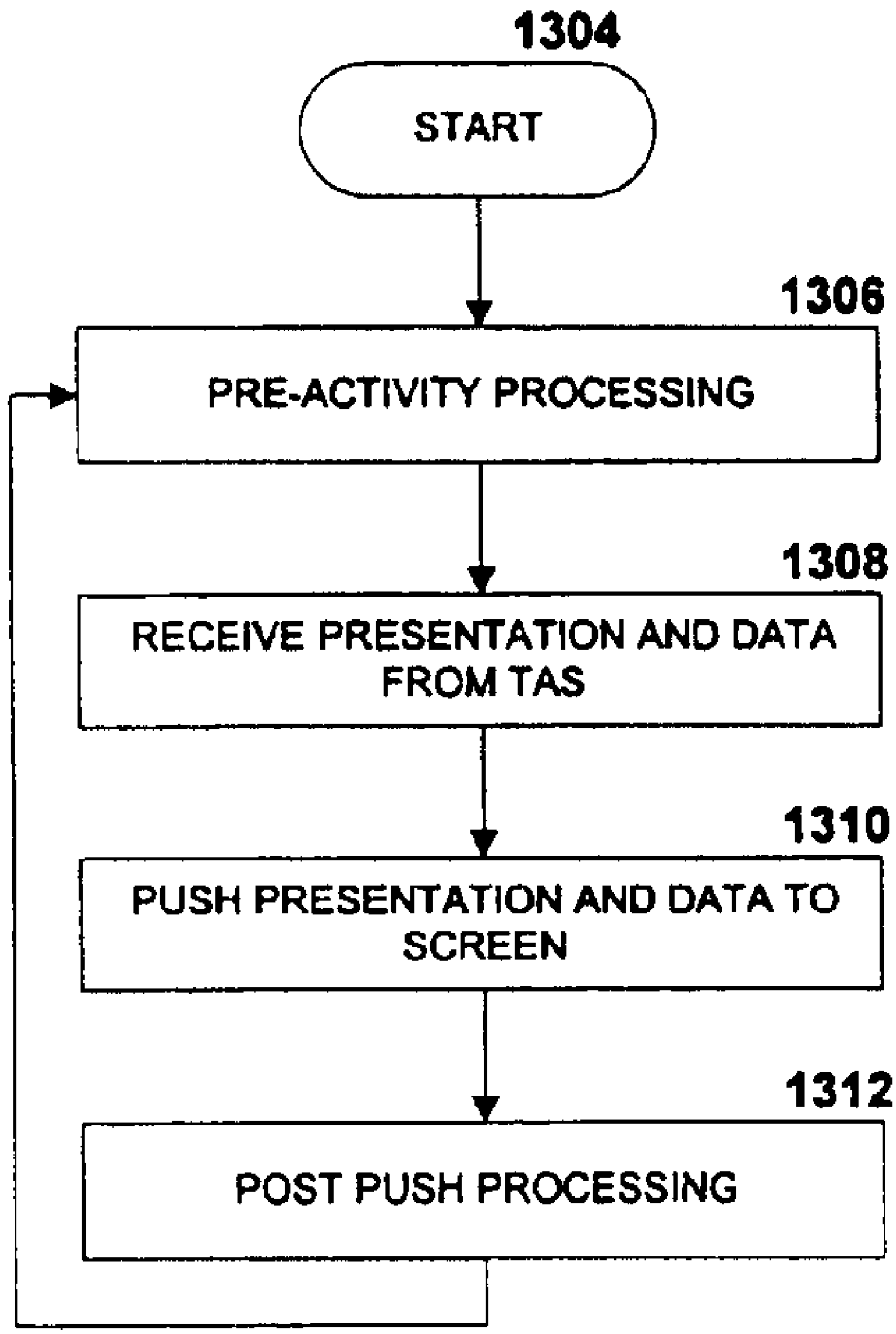

FIGS. 13A to 13C illustrate exemplary communications flow between a BOSS software controlled computer 350 and a client computer 310 having a form-driven transaction application server 311 and a presentation manager 320 in accordance the present invention. At the outset, it will be appreciated that the following FIGS. 13A through 17 represent exemplary communications in accordance with the present invention. In a general fashion, these figures illustrate aspects of server computer(s) in operation in a form-driven computer system in accordance with the present invention. A flow diagram in this regard, however, can be misleading, for example, because certain acts represented by a flow point or node can be handled by interrupts that "happen when they happen" or since data may generally stream continuously to and from the various components depicted in FIGS. 11A and 11B. Also, some acts may occur simultaneously with others; nonetheless, the illustration of exemplary communications and duties of components in such a form-driven computer system is useful for conveying both specific and general aspects of the present invention. Also, the processes diagrammed in FIGS. 13A through 17 can be simultaneous processes and invariably joined together, and as such should construed in connection with other diagrams where appropriate.

FIG. 13A shows exemplary communications between a BOSS software controlled computer 350 and a client computer 310 from the perspective of the client computer 310. After initialization and pre-request processing of the client computer 310 at 1200 and 1202, TAS 311 of client computer 310 sends BOSS software controlled computer 350 a request for panel definitions at 1204. The client computer 310 then performs some pre-response processing in preparation for the delivery of panel definitions at 1206. TAS 311 receives the panel definitions provided by BOSS software controlled computer 350 at 1208. As shown by the parallel paths of 1210 to 1216 and 1218 to 1222, TAS 311 requests and receives data (1210 to 1216) while simultaneously building the panel (1218 to 1222). At 1224 and 1226, TAS 311 builds the presentation to be presented on output device 330 and populates the presentation with data. At 1228, TAS 311 sends the populated presentation to presentation manager 320 and the presentation manager 320 sends or pushes the presentation to output 330. Then, the populated presentation is displayed, and the system may await user input.

When input is received from an input device 340, it is further communicated to the BOSS software controlled computer 350 for validation. At 1230, before input is received, TAS 311 performs pre-interaction processing. At 1232, user input might be received which is sent to BOSS software controlled computer 350 by TAS 311 at 1234. As mentioned, BOSS software controlled computer 350 may serve to validate the user input as proper input. Thus, at 1236, pre-validation processing is performed by BOSS software controlled computer 350. If validation is not granted at 1238, at 1240 TAS 311 notifies the presentation manager 320, and the flow returns to 1230. The presentation manager 320 may alter the presentation or push a message to the user indicating the lack of validation and then prepare the system to receive additional or replacement user input. If validation is granted at 1238 and the data indicates a request to complete the interaction at 1242, the flow diagram ends at 1248. If the validation is granted, but the data does not indicate a request to complete the transaction at 1242, TAS 311 continues to perform further pre-request processing for further data needed to complete the interaction at 1244, which data may be received at 1246. The flow may then continue at any one of a variety of locations in the flow diagram, such as 1204, in order to collect the further form data that may complete the interaction.

FIG. 13B shows exemplary communications between a BOSS software controlled computer 50 and a client computer 310 from the perspective of BOSS software controlled computer 50. After start 1250, BOSS software controlled computer 350 performs pre-request processing in preparation for a request for panel definitions from a client computer 310 at 1252 or BOSS software controlled computer 350 pushes a message or the like to the devices 310, where appropriate. At 1254, BOSS software controlled computer 350 receives a request for panel definitions from TAS 311 and performs pre-response processing at 1256. At 1258, BOSS software controlled computer 350 sends the requested panel definitions to TAS 311. Then, at 1260, BOSS software controlled computer 350 performs pre-request processing for data. At 1262, BOSS software controlled computer 350 receives a request for data from TAS 311. Before responding, BOSS software controlled computer 350 performs pre-response processing at 1264. At 1266, BOSS software controlled computer 350 sends the requested data to TAS 311 and then the client device 310 builds the panel for displaying a presentation to a user output device 330.

At 1268, BOSS software controlled computer 350 performs pre-data receipt processing and then at 1270 receives data from TAS 311 that has been input in response to the presentation. Once the data is received, at 1272, BOSS software controlled computer 350 may perform pre-processing in preparation for a validation request received at 1274. At 1276, the validation procedure is performed and completed. At 1278, validation information computed at 1276 is sent to TAS 311. At 1280, a determination is made as to whether the data received at 1270 indicates the completion of an interaction. If so, at 1282, some or all of the data received by BOSS software controlled computer 350 during the process of the flow diagram is marked for saving. Pre-confirmation of save processing begins at 1284, followed at 1286 by confirmation from database 355 that the write or save operation has occurred properly. A determination is made at 1288 as to whether the process confirmation is complete. If so, TAS 311 is notified at 1290 of the completed interaction and the flow exits at 1302. If not, TAS 311 is notified that the data was not saved to the database properly, and the flow may proceed again from, e.g., 1268, where BOSS software controlled computer 350 prepares for the reception of the same or new data from a user, so that the interaction may be completed properly.

If, however, at 1280, the user data indicates that the interaction is not complete e.g., if more form data needs to be collected and/or the like, data is processed at 1292, and at 1294 the data is sent to TAS 311. More particularly, if the data does not include an interaction completion request, BOSS software controlled computer 350 processes the data at 1292, either by passing it to other applications 365 or passing it to data storage 355, or by passing commands (as specified by the data) to load or launch additional applications 365. BOSS software controlled computer 350 then receives data from the applications 365 or storage 355. BOSS software controlled computer 350 then sends the data to TAS 311 at 1294, which then processes the data and forms a request for panel definitions (See FIG. 13A). At 1296, BOSS software controlled computer 350 receives the request for panel definitions from TAS 311 of client device 310. At 1298, pre-response processing of the request occurs and the panel definitions are sent to TAS 311 of the client device 310 at 1300. The flow then returns to 1268 so that BOSS software controlled computer 350 may again prepare for the receipt of additional data that may complete the interaction.

As noted, the present invention may be used in connection with the pushing of a message or data to a device 310. For example, after a user initiates a session with or logs on to a device 310*a*, e.g., the user may cause some activity, data retrieval or processing to occur in connection with BOSS software controlled computer 350, databases 355 or other applications 365, such that implications may arise for another user registered with the system. In essence, some activity may occur in the system such that a message, or other data packet may need to be sent to a second or other user. When that other user logs on to or initiates contact with the system, after verification of the other user, BOSS software controlled computer 350 causes the message or other data packet to be sent or pushed to the other user as soon as possible or when otherwise appropriate.

FIG. 13C shows exemplary communications between BOSS software controlled computer 50 and a client device 310 from the perspective of the presentation manager 320, and is illustrative of push capabilities in accordance with the present invention. While a user may opt out of any such push capabilities, the present implementation assumes that data is being pushed to a client device from another client device 310, application 365 and/or database 355 via a BOSS software controlled computer 350. After start 1304, the presentation manager 320 performs pre-activity processing at 1306, such as preparation for the reception of a presentation and corresponding data from TAS 311. At 1308, presentation manager 320 receives the presentation and corresponding data from TAS 311 via a BOSS software controlled computer 350. At 1310, presentation manager 320 pushes the data and presentation to the user output device 330. The presentation manager 320 may thus be used in connection with push technology techniques, wherein form data received via TAS 311 from a BOSS software controlled computer 350 is output to an output device 330. At 1312, post push processing occurs and the presentation manager 320 proceeds to 1306, e.g., in order to prepare for a new reception of a presentation and corresponding data.

Figure 14A:
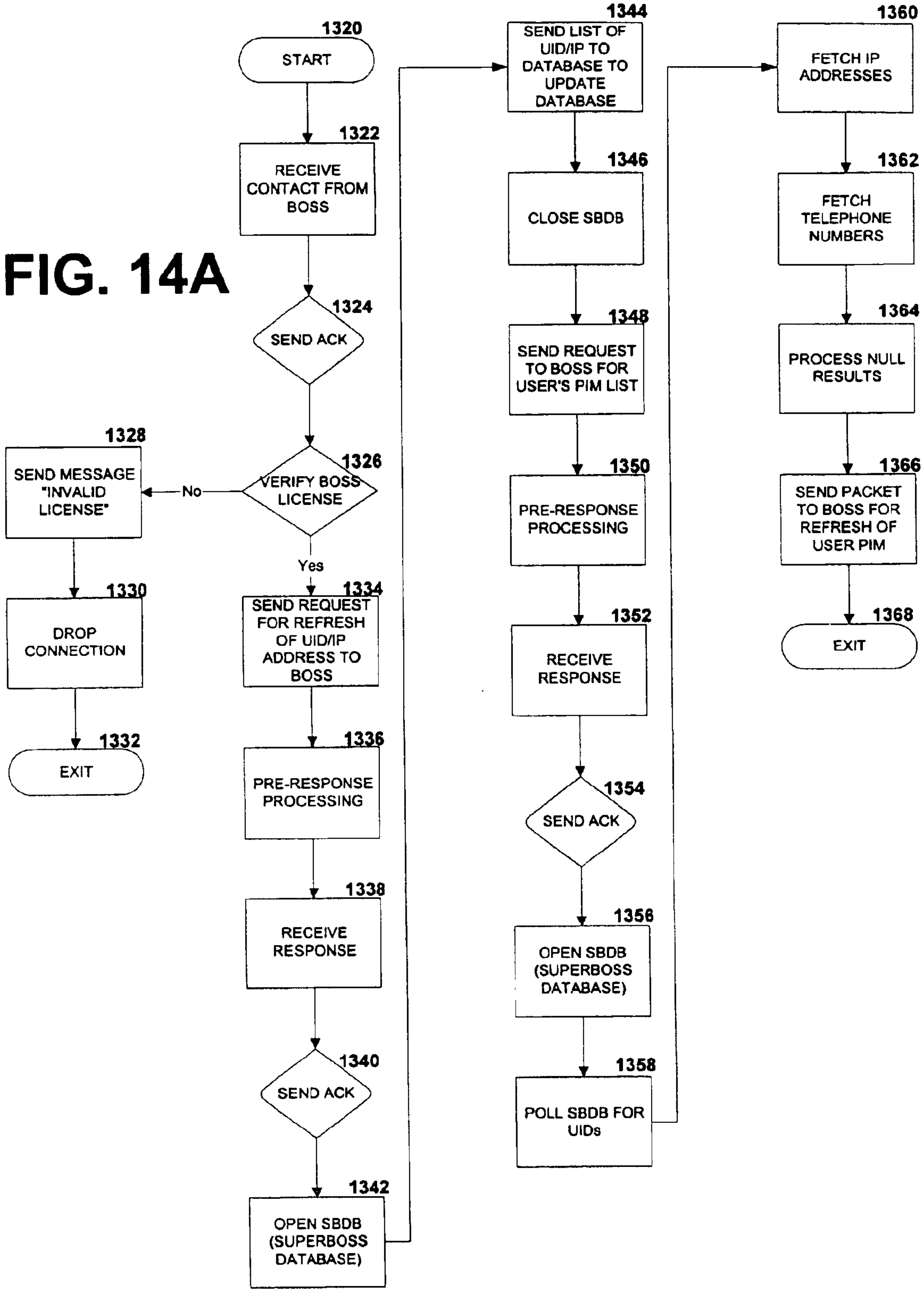
FIGS. 14A and 14B are flow diagrams of exemplary communications between a SuperBOSS/locator and a BOSS software controlled computer in accordance with the second embodiment of the present invention.

FIG. 14A shows an exemplary communications flow between a SuperBOSS 360 and a BOSS software controlled computer 350 from the perspective of SuperBOSS 360. After start 1320, SuperBOSS 360 is contacted by BOSS software controlled computer 350 with data including BOSS license information. BOSS license information may include various information and may include data relating to BOSS software controlled computer 350 identification, data specifying with whom BOSS software controlled computer 350 communicates and the like. SuperBOSS 360 sends acknowledgment of contact to BOSS software controlled computer 350 at 1324. At 1326, SuperBOSS 360 verifies the BOSS. license information.

If the BOSS license information is not valid, then at 1328, 1330 and 1332, SuperBOSS 360 sends a message to BOSS software controlled computer 350 regarding the improper license, terminates the connection with the BOSS software controlled computer 350 making the contact, and the flow exits.

If the BOSS license information is valid, at 1334, SuperBOSS 360 sends a request to BOSS software controlled computer 350 for a refresh of User Identifications (UIDs) and current IP addresses and/or other network identification information. At 1336, SuperBOSS 360 performs pre-response processing in preparation for the receipt of refreshed identification information at 1338. At 1340, SuperBOSS 360 sends acknowledgment to BOSS software controlled computer 350 that the refresh information was received properly. At 1342, SuperBOSS 360 opens a connection to SuperBOSS Database (SBDB) 370. At 1342, SuperBOSS 360 sends the list of UIDs and current IP addresses and/or other identification information to SuperBOSS Database 370. At 1346, SuperBOSS 360 closes the connection to SuperBOSS Database 370.

At 1348, SuperBOSS 360 sends a request to BOSS software controlled computer 350 for a specific user's PIM (personal information manager) list. The PIM is the contact managing object used to keep track of contacts (address, phone numbers, etc.), appointments, to do lists, reminders, and so on. At 1350, SuperBOSS 360 performs pre-response processing in preparation for the receipt of the user's PIM list. At 1352, SuperBOSS 360 receives the response from BOSS software controlled computer 350 including PIM information, and acknowledgement of the same is sent at 1354. At 1356, SuperBOSS 360 opens a connection to the SuperBOSS Database 370. At 1358, SuperBOSS 360 polls SuperBOSS Database 370 for UIDs and current IP Addresses and/or other identification information. The IP addresses and telephone numbers are retrieved at 1360 and 1362 and then SuperBOSS 360 closes the connection to SuperBOSS Database 370. For example, SuperBOSS 360 may open a connection to the SB PSTN Database 370*b*, and then SuperBOSS 360 can poll SB PSTN Database 370*b* for PSTN numbers. SuperBOSS 360 may then close the SB PSTN Database 370*b* having retrieved the appropriate PSTN numbers. After a process null results at 1364, SuperBOSS 360 sends the packet of identification information to BOSS software controlled computer 350 for refresh of user PIM at 1366. Null results are dummy processes that are run to delay until phone numbers and/or IP addresses are fetched. The flow may then exit at 1368.

Figure 14B:
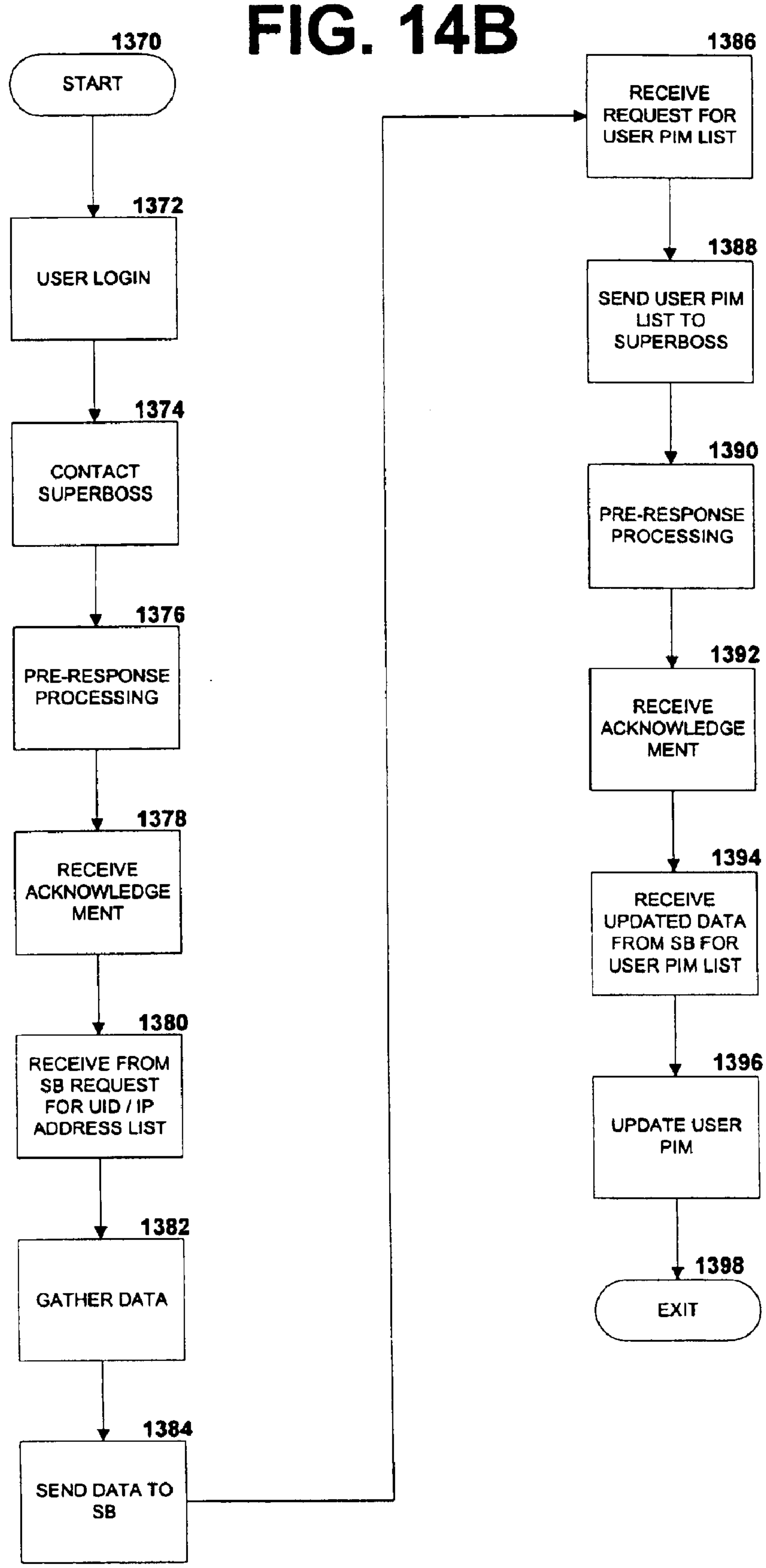

FIG. 14B shows exemplary communications between a SuperBOSS 360 and a BOSS software controlled computer 350 from the perspective of BOSS software controlled computer 350. After start 1370 and upon successful session initiation, such as user login, at 1372, BOSS software controlled computer 350 initiates contact with SuperBOSS 360 at 1374. The information used in contacting the SuperBOSS 360 may include BOSS license information. After pre-response processing in preparation for a response from SuperBOSS 360 at 1376, BOSS software controlled computer 350 receives acknowledgement of the request for contact from SuperBOSS 360 at 1378. If the BOSS license information is invalid, BOSS software controlled computer 350 receives notification from SuperBOSS 360, and BOSS software controlled computer 350 notifies the system administrator (not shown) of the application database and/or the application that controls the PIN info i.e., the PSTN numbers and IP addresses and the flow may terminate. If the BOSS license information is valid, BOSS software controlled computer 350 receives a request for data (UID/IP Address and/or other identification information) from SuperBOSS 360 at 1380. At 1382, BOSS software controlled computer 350 collects the requested data and at 1384 BOSS software controlled computer 350 sends the UID/IP Address and/or other identification data to SuperBOSS 360. At 1386, BOSS software controlled computer 350 receives a request for user PIM data from SuperBOSS 360. At 1388, BOSS software controlled computer 350 sends the user PIM data to SuperBOSS 360. At 1390, BOSS software controlled computer 350 performs pre-response processing in preparation for the receipt of updated data. At 1392, BOSS software controlled computer 350 receives acknowledgement of proper receipt of user PIM data from SuperBOSS 360. At 1394, BOSS software controlled computer 350 receives updated PIM data from SuperBOSS 360. At 1396, BOSS software controlled computer 350 updates the user PIM data and the flow may exit at 1398.

Figure 15:
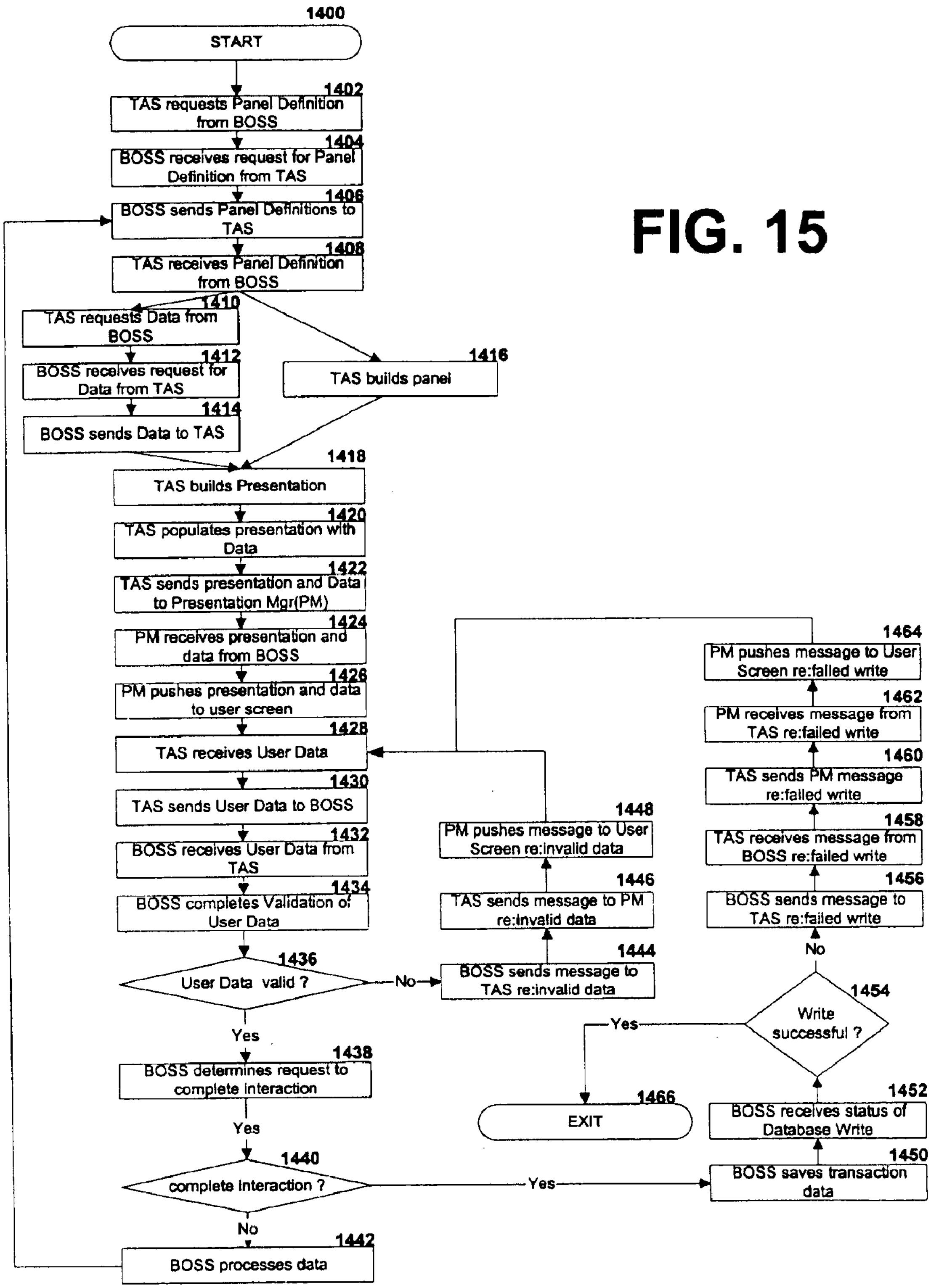
FIG. 15 is an integrated flow diagram of the exemplary communication flows shown in FIGS. 13A through 13C in accordance with the second embodiment of the present invention.

FIG. 15 shows an integrated flow diagram of the exemplary communications illustrated in FIGS. 13A through 13C. After start 1400 and upon successful session initiation, such as user login, TAS 311 sends BOSS software controlled computer 350 a request for panel definitions at 1402. At

1404, BOSS software controlled computer 350 receives the request for panel definitions. At 1406, BOSS software controlled computer 350 sends the requested panel definitions. At 1408, TAS 311 receives panel definitions from BOSS software controlled computer 350. As described previously (See FIG. 13A), TAS 311 builds the panel (1416) while TAS 311 requests data (1410), BOSS software controlled computer 350 receives the request (1412) and BOSS software controlled computer 350 sends the requested data to TAS 311 (1414) or TAS 311 receives a message pushed from a BOSS software controlled computer 350.

At 1418, TAS 311 builds the presentation. At 1420, TAS 311 populates the presentation with data. At 1422, TAS 311 sends the presentation and data to the presentation manager 320. At 1424, the presentation manager 320 receives the presentation and data from TAS 311. Then, at 1426, the presentation manager 320 pushes the presentation and data to the user output 330. At 1428, TAS 311 receives user data from input device 340. At 1430, TAS 311 sends the user data to BOSS software controlled computer 350. At 1432, BOSS software controlled computer 350 receives the user data from TAS 311. At 1434, BOSS software controlled computer 350 completes validation of user data ensuring that the data input to input device 340 is proper. If the user data is not valid at 1436, BOSS software controlled computer 350 sends a message to TAS 311 regarding the invalid user data (1444), TAS 311 sends an appropriate corresponding message to presentation manager 320 (1446), and the presentation manager 320 pushes the message regarding the invalid user data to user output device 330. The flow may then return to 1428, where TAS 311 may receive user data once again.

If the user data is valid at 1436, BOSS software controlled computer 350 determines whether the data includes a request to complete the interaction (1438).

If the data contains no indication of a complete interaction at 1440, BOSS software controlled computer 350 processes the data at 1442 and the flow returns to 1406 where BOSS software controlled computer 350 may again send panel definitions to TAS 311.

If the user data does indicate a complete interaction at 1440, BOSS software controlled computer 350 initiates a save of the transaction data at 1450, e.g., to database 355. At 1452, BOSS software controlled computer 350 receives the status of the attempt to save the transaction data. If the save of the transaction data to the database is successful at 1454, the flow may exit at 1466. If saving the transaction data is not successful at 1454, BOSS software controlled computer 350 sends a message to TAS 311 regarding the failed database write at 1456. At 1458, TAS 311 receives the message from BOSS software controlled computer 350 regarding the failed database write. Next, at 1460, TAS 311 sends a message regarding the failed database write to the presentation manager 320 and at 1462, the presentation manager 320 receives the same. At 1464, the presentation manager 320 pushes the message regarding the failed database write to output device 330. The flow may then return, e.g., to 1428 where TAS 311 receives user data input to input device 340.

Figure 16:
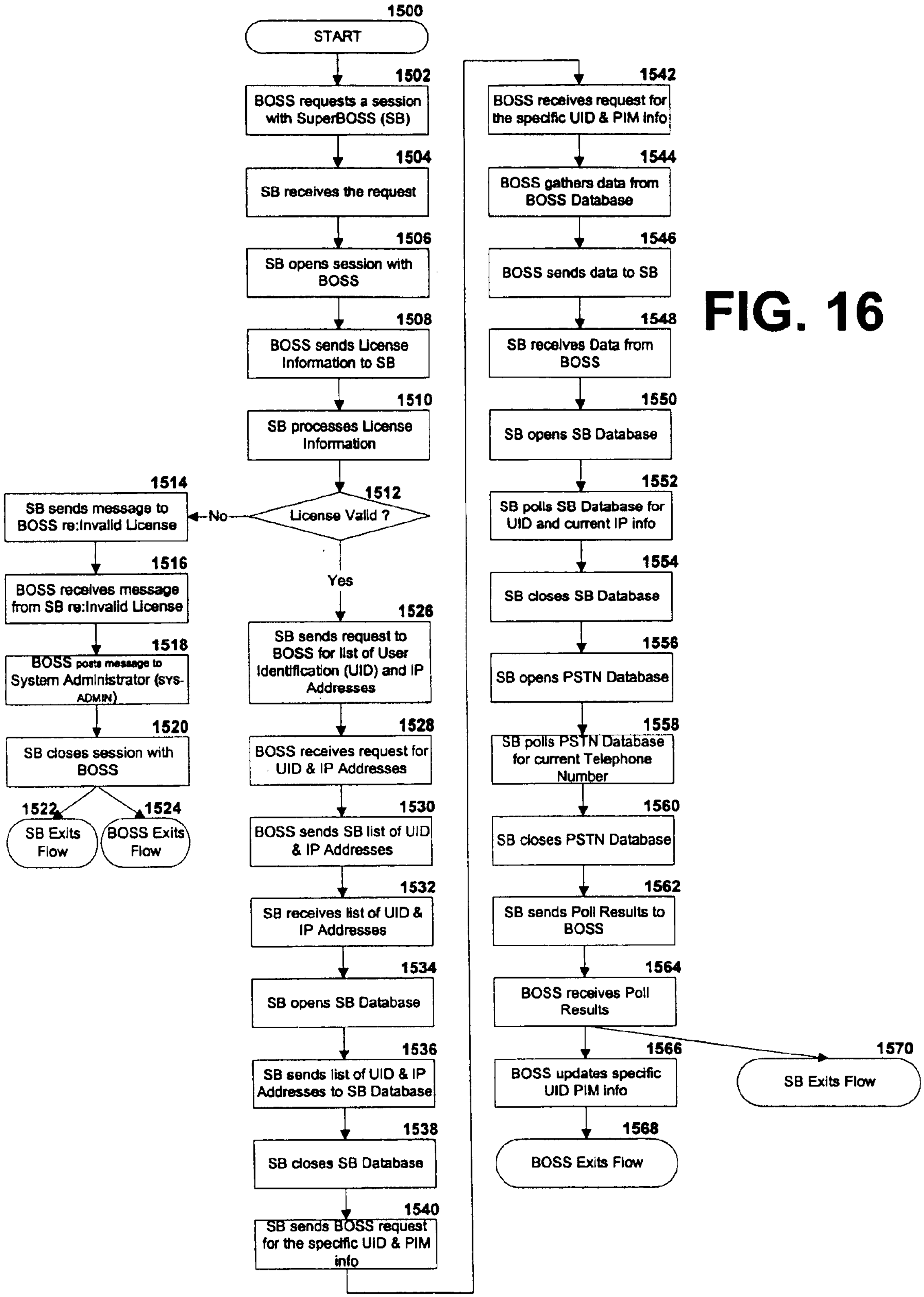
FIG. 16 is an integrated flow diagram of the exemplary communication flows shown in FIGS. 14A and 14B in accordance with the second embodiment of the present invention.

FIG. 16 shows an integrated flow diagram of the exemplary communications illustrated by FIGS. 14A and 14B. After start 1500 and upon successful user session initiation, BOSS software controlled computer 350 makes a request for communications with SuperBOSS 360 at 1502. At 1504, SuperBOSS 360 receives the request for communications from BOSS software controlled computer 350. At 1506, SuperBOSS 360 opens a connection/session with BOSS software controlled computer 350. At 1508, BOSS software controlled computer 350 sends BOSS license information to SuperBOSS 360. At 1510, SuperBOSS 360 processes the BOSS license information.

If the BOSS license is not valid at 1512, SuperBOSS 360 sends notification of the invalid license to BOSS software controlled computer 350 at 1514. At 1516, BOSS software controlled computer 350 receives the message sent by SuperBOSS 360. At 1518, BOSS software controlled computer 350 posts a message to the System Administrator regarding the invalid license. At 1520, SuperBOSS 360 closes the connection/session with BOSS software controlled computer 350 and then SuperBOSS 360 and BOSS software controlled computer 350 may exit at 1522 and 1524, respectively.

If the BOSS license is valid at 1512, then at 1526, SuperBOSS 360 sends a request to BOSS software controlled computer 350 for a list of all User Identification (UID), IP Addresses and/or other identification information. At 1528, BOSS software controlled computer 350 receives the request for UID, IP Addresses and/or other identification information from SuperBOSS 360. At 1530, BOSS software controlled computer 350 sends the list of UID, IP Addresses and/or other identification information to SuperBOSS 360. At 1532, SuperBOSS 360 receives the list of UID, IP Addresses and/or other identification information from BOSS software controlled computer 350. At 1534, SuperBOSS 360 opens a connection to SuperBOSS Database 370, e.g., 370*a* or 370*b*. At 1536, SuperBOSS 360 sends the list of UID, IP Addresses and/or other identification information to SuperBOSS Database 370. At 1538, SuperBOSS 360 closes the connection to SuperBOSS Database 370.

At 1540, SuperBOSS 360 sends a BOSS software controlled computer 350 a request for specific UID and PIM information. At 1542, BOSS software controlled computer 350 receives the request for specific UID and PIM information. At 1544, BOSS software controlled computer 350 retrieves data e.g., from a BOSS Database 355. At 1546, BOSS software controlled computer 350 sends data to SuperBOSS 360. At 1548, SuperBOSS 360 receives data from BOSS software controlled computer 350. At 1550, SuperBOSS 360 opens a connection to SuperBOSS Database 370 e.g., 370*a*. At 1552, SuperBOSS 360 polls SuperBOSS Database 370 for UID, current IP address or other identification information. At 1554, SuperBOSS 360 closes the connection to SuperBOSS Database 370.

At 1556, SuperBOSS 360 opens a connection to PSTN Database 370*b*. At 1558, SuperBOSS 360 then polls the PSTN Database 370*b* for a current telephone number or IP address. At 1560, SuperBOSS 360 closes the connection to PSTN Database 370*b*. At 1562, SuperBOSS 360 sends the result(s) of the polling to BOSS software controlled computer 350. At 1564, BOSS software controlled computer 350 receives the result(s) of the polling from SuperBOSS 360 and BOSS software controlled computer 350 may push any messages to appropriate client devices having located the appropriate devices. Then, from 1564, BOSS software controlled computer 350 updates the specific user identification PIM information (1566) before exiting at 1568 and SuperBOSS 360 exits at 1570.

Figure 17:
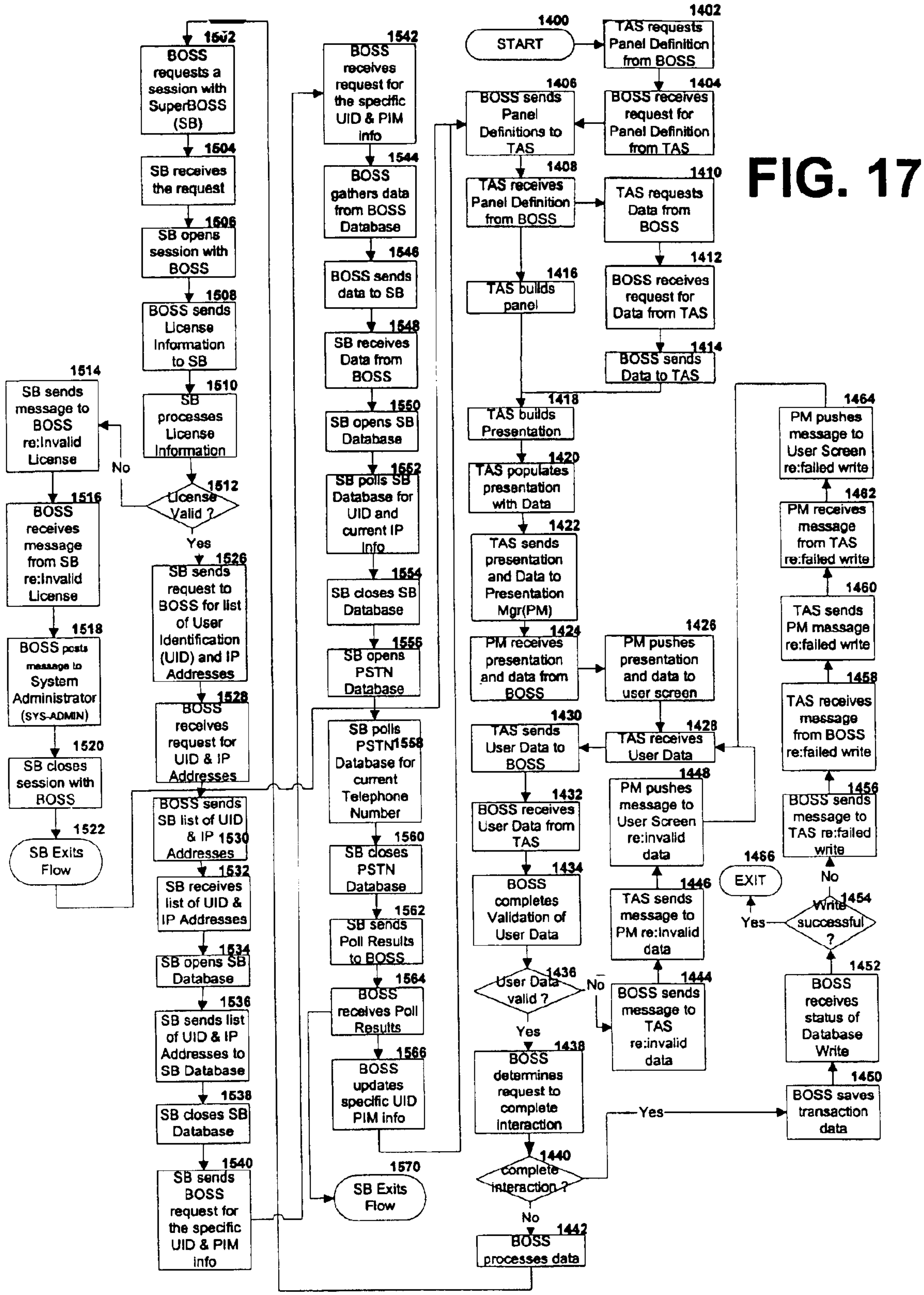
FIG. 17 is an integrated flow diagram of the exemplary communication flows shown in FIGS. 15 and 16 in accordance with the second embodiment of the present invention.

FIG. 17 shows an integrated flow diagram of the exemplary communication flows illustrated in FIGS. 15 and 16. After SuperBOSS (SB) 60 exits the flow at 1522, the flow may connect, for example, to 1406, wherein the system is handling the transmission of panel definitions from BOSS software controlled computer 350 to TAS 311. Also, after 1566, instead of exiting the flow diagram, BOSS software controlled computer 350 may perform system duties at 1406. Further, after 1442 where BOSS software controlled computer 350 is s processing data, instead of the flow returning to 1406, the flow may instead proceed, for example, to 1502. An integrated flow among SuperBOSS database(s) 370, SuperBOSS 360, BOSS software controlled computers 350, TAS 311, presentation manager 320 and input and output devices 340 and 330 is thus illustrated in FIG. 17; however, it should be reemphasized that the flow diagram represents an exemplary choice, and thus the methods and system described herein should not be restricted to the exemplary flow shown and described.

7. Client Device Transaction or Form-Driven System—More Examples

While the following describes exemplary uses for the transaction driven system of the present invention, it will be appreciated that the number of applications in which the flow of data to and from remote locations is advantageous is very large, and accordingly, the following examples are intended for illustrative purposes only.

With respect to the healthcare industry, BOSS software controlled computers 350 and client devices 310 with TAS 311 may be used to create an industrial grade, multi-media Internet/intranet system, a utility capable of practically eliminating paper transactions. The new information flow, like that in banking and travel, creates real-time transactions with data repository and mining capability. Opportunity is created to reduce costs, enhance efficiency and create an infinite variety of e-content and e-commerce applications.

This utility can receive, move, store and manipulate millions of multi-media transactions a day to and from anywhere in the world. The utility is designed with major hubs that link thousands of portals to each other, thereby linking the entire healthcare trading partners in a real-time interactive network. Like other utilities, it is transaction driven, deriving its revenues from moving and selling communications, content, commerce, data handling, storage and data mining.

This utility allows patients from their office or home location to schedule appointments, order authorized prescriptions, contact and interact with healthcare providers, or access their medical reports in a secure telecommunications environment. Healthcare providers can update medical provider information or access several medical databases with a common secure format.

For example, it may be that a surgeon is about to perform surgery on a patient. With one or more client devices 310, for example, attached to the patient in some fashion, or linked to patient vital statistics or information, valuable information may be processed in connection with the operation. A full blown operating system is unnecessary to process the data, and accordingly such an application is suited to the fast and efficient processing and transmission techniques of the present invention. The surgeon might connect a secure client device to a heart monitor and feed the information in real time for processing to a central location. BOSS software controlled computers 350 may aid in the performance of the processing from any location in the system and locator computer 360 may aid in the process of locating the appropriate computers 350 for the performance of the processing. A BOSS software controlled computer 350 may then deliver vital time sensitive information to the surgeon. It may be determined in real time, for example, that a patient's heart rate is following an irregular but correctable pattern. In this manner, the surgeon may gain valuable time sensitive information in a secure manner.

With respect to medical records, it is a common scenario for a doctor to require a patient's medical records right away. A full blown operating system is unnecessary to deliver the record, and accordingly such an application is suited to the fast and efficient processing and transmission techniques of the present invention. A registered hospital employee might log in to a secure client device and request a patient record. BOSS software controlled computers 350 may aid in the performance of the retrieval of the record from any location in the system and locator computer 360 may aid in the process of locating the appropriate computers 350 for the performance of the record retrieval. A BOSS software controlled computer 350 may then deliver the record to the hospital employee for seamless and fast delivery of necessary data. For example, the hospital employee may gain information concerning patient allergies in a secure manner.

With respect to hospitality services, BOSS software controlled computers 350 and client devices 310 with TAS 311 may be used to provide travelers and guests with greater enjoyment and productivity. As the majority of hotel guests go online from their rooms, hotels are facilitating the process through in-room Internet access solutions. Guests can be better served by using a telecommunications appliance and related middleware as an opportunity to access value-added online tools and information that improve their experience.

Guests can access several information sources such as the hotel kiosk information center for daily event notices, make direct on-line reservations with restaurants, museums, theaters, or sports/entertainment facilities. In addition, they have the interactive capability to do travel planning, online shopping, and obtain local destination information.

With respect to the sweep the desktop context, BOSS software controlled computers 350 and client devices 310 with TAS 311 may be used to help the enterprise remove the traditional barriers between legacy information and telephony services. Information and telephony services that are traditionally operated as wholly independent services are now integrated and offered as a single service. Through common interfaces, users can access, as well as be notified of, various message types—voice, video, text, image, and data— independent of the means of access. These fundamental changes in underlying technology are possible because of the ability of BOSS software controlled computers 350 and client devices 310 with TAS 311 to offer a platform for development of application interfaces between both packet data networks and circuit switched telephone networks without any operating system limitations. The open platform of the present invention thus flexibly enables data communications of any kind efficiently and without the complexity of traditional operating systems, although as mentioned previously, an additional operating system, for instance, for handling videoconferencing may be included with the form-driven operating system for additional functionality.

With respect to messaging applications, BOSS software controlled computers 350 and client devices 310 with TAS 311 may be used to promote the next generation of messaging services to an enterprise. The current issue is how to filter and control information in a way that makes sense for the individual need of a company's employees while mapping, or improving, the company's strategic business objectives. A system with BOSS software controlled computers 350 and client devices 310 with TAS 311 allows the conglomeration of many technologies into a single easy-to-use interface that includes real-time communication with coworkers, and a link back to any relevant corporate data that can be quickly and easily updated and distributed. It marries the various communication technologies into single packages or services.

For example, employees can easily lookup and connect employees to on-line videoconferences and exchange information from disparate databases under a common view and format. This allows employees to truly become knowledge workers and assist organizations to make faster and better decisions based on the expertise of all relevant knowledge workers rather than outcomes of time consuming committees.

While the second embodiment of the present invention teaches additional features and communications in accordance with the present invention, it should be understood that various aspects of the first embodiment may be applied to or are duplicated in the second embodiment. At the same time, various techniques and communications described in connection with the second embodiment may likewise be incorporated into the first embodiment. For example, transaction entry device 12 may be a client device 310, database servers 28 may be a BOSS software controlled computer 350, databases 11, 12, etc. may be databases 355, and so on.

Those skilled in the art will appreciate that the invention is unique by virtue of its ability to generalize applications to forms so that no code need to be written to implement a particular function. However, if code is needed or if multimedia data is to be part of a data transaction, it can be attached to a form that is stored as a parameter stream in a stream of data. Also, though the transaction entry device 12 has been described as a computer workstation, handheld device, PC, etc., it can also be used in conjunction with an optional off-line storage device as a self-contained workstation and database unit independent of traditional operating systems. The transaction entry device 12 can also be used with an additional optional plug in as a network server or as a user interface in a network docking station.

The various techniques described herein may be implemented with hardware or software or, where appropriate, with a combination of both. For example, the transaction application server of the present invention may be implemented with software, hardware or a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. For example, firmware may be stored in a device such EPROM, PROM, ROM and so on. In the case of program code execution on programmable computers, the computer will generally include a processor, a storage medium readable by the processor (including volatile and nonvolatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while a data entry device in accordance with the present invention has a TAS stored thereon, it should be emphasized that a variety of computer platforms, including handheld device operating systems and other application specific operating systems could supplement the functionality of the operating system described in the present invention. Therefore, the present invention should not be limited to any single embodiment, but rather construed in dance with the appended claims.

What is claimed is:

1. A server computer operating in a form-driven computer system including a plurality of client devices having a form-driven operating system stored thereon wherein said server computer receives data in the format of a form, retrieves data from respective fields of the form and transmits at least portions of the data from the respective fields to at least one of said plurality of client devices, further comprising:

a computer-readable medium having computer-executable instructions stored thereon, said computer-executable instructions having broad operations system server (BOSS) software objects including:

a locator object for retrieving at least one of an IP address number, a PSTN number and other network identification information for use in identifying and locating at least one user and at least one client device for use with BOSS software objects to which to route the field data;

a pushing object for pushing data to at least one client device;

a linking object for linking client devices, applications, databases, additional server computers and said locator object; and a conduit object for routing data to at least one of a client device, an application, a database, another server computer and said locator object.

2. A server computer according to claim 1, wherein data communications to a client device include fields for storing parameters for use by the client device in determining the appropriate data response from the client device.

3. A server computer according to claim 2, wherein a field for storing said parameters has a fixed length.

4. A server computer according to claim 2, wherein a field for storing said parameters has a variable length.

5. A server computer according to claim 2, wherein a field for storing said parameters is modified dynamically by at least one of a client computer, another server computer and an application.

6. A server computer according to claim 1, wherein said data represents at least one of text, audio, voice, form, table, menu, video, and graphic information.

7. A server computer according to claim 1, wherein said data being pushed by said pushing object is received from at least one of another server computer, a database, an application and a database.

8. A server computer according to claim 1, wherein said data being pushed by said pushing object is generated by said server computer.

9. A server computer according to claim 1, further comprising an application program that carries out tasks and assists in the generation of at least one of text, audio, voice, table, menu, video, and graphic information.

10. A server computer according to claim 1, further comprising a database that stores at least one of text, audio, voice, table, menu, video, and graphic information for access by at least one of said server computer and an application.

11. A server computer according to claim 1, further comprising encryption and authentication software that encrypts each form and its associated data and applies authentication techniques to at least one of a user and a system component to provide an additional layer of security, said authentication techniques utilizing at least one of a magnetic card, a micro-chip card, techniques for physical authentication including at least one of password, iris scan, retina scan, fingerprint, voice signature, physical appearance, body signals and signs.

12. A server computer according to claim 1, wherein said locator object is utilized in connection with identifying a location of at least one of said user and a client device at which the user has initiated a session, and said pushing object pushes data the client device where said user has initiated the session with the system.

13. A server computer according to claim 12, wherein data pushed to the user's client device by said pushing object is generated as a result of a transaction initiated by a user, previously having initiated a session with said client device.

14. A server computer according to claim 1, wherein said data may be modified by at least one of a server computer having BOSS software and a system application.

15. A server computer according to claim 1, wherein data pushed to the user's client device by said pushing object is generated as a result of a transaction initiated by a user, previously having initiated a session with another client device of said system.

16. A server computer according to claim 1, wherein a user that has initiated a session with a client device requests a form for delivery to said client device and said locator object assists in locating said form and once located, said server computer aids in the performance of said request.

17. A server computer according to claim 1, wherein a user that has initiated a session with a client device requests a task from a menu displayed on an output device of the client device and said server computer processes said task.

18. A server computer according to claim 1, wherein a user that has initiated a session with a client device requests a report via an input device of said client device from at least one of a menu, list and table displayed on an output device of the client device and said server computer aids in the generation and delivery of said report to the user as visual or audio data.

19. A server computer according to claim 1, wherein a user that has initiated a session with a client device requests a process from an input device of the client device and the server computer aids in the performance of said process, wherein the results of said process are displayed on an output device of said client device in at least one of visual and audio form.

20. A server computer according to claim 1, wherein said locator object provides identification information that is used by said pushing object to determine where to push data.

21. A server computer according to claim 1, wherein said locator object provides identification information that is used by said linking object to determine which system components to link.

22. A server computer according to claim 1, wherein said locator object provides identification information that is used by said conduit object to determine where to route data.

23. A method for communicating in a computer system including form-driven client computing devices, comprising the steps of:

initiating a user session with a form-driven transaction application server (TAS) of a client device;

determining user and device identification information with a locator object stored on a server computer that maintains network, device and user identification and location information;

determining whether transaction data from another user already exists in said system for said user; and pushing said transaction data to said client device if transaction data for said user from said another user already exists.

24. A method for communicating in a computer system including form-driven client computing devices according to claim 23, further comprising the step of:

securing and authenticating communications with said client device.

25. A method for communicating in a computer system including form-driven client computing devices, comprising the steps of:

initiating a user session with a form-driven transaction application server (TAS) of a client device;

determining user and device identification information with locator software stored on a server computer that maintains network, device and user identification and location information;

inputting a request for a transaction into said client device; and utilizing said user and device identification information to identify another client device for processing said transaction.

26. A method for communicating in a computer system including form-driven client computing devices according to claim 25, further comprising the steps of:

requesting information for a form from a server computer;

locating said form information with the assistance of said locator software;

delivering said form information to said TAS; and displaying said form on a display device of said client device.

27. A method for communicating in a computer system including form-driven client computing devices according to claim 25, further comprising the steps of:

displaying menu data to said user via a display device of said client device;

selecting a task to be performed from said menu;

transmitting a description of said selected task to a server computer for performance of said task; and said server computer forwarding the task request to at least one of databases, system applications, programs, and other server computers with the assistance of said locator software for completion of said task.

28. A method for communicating in a computer system including form-driven client computing devices according to claim 25, further comprising the steps of:

requesting from a server computer a report via at least one of a form, menu, list, audio, video and table output on an output device of said client device;

selecting at least one task to be performed by at least one of other server computers, system applications and databases in order to collect the information for said report; and transmitting said report information to said TAS for display on said output device of said client device.

29. A method for communicating in a computer system including form-driven client computing devices according to claim 25, further comprising the steps of:

requesting from a server computer a process via one of a form, menu, list, video display, text, voice input, audio input and table output on an output device of said client device; and selecting at least one task to be performed by at least one of other server computers, system applications and databases in order to complete said process.

30. A method for communicating in a computer system including form-driven client computing devices according to claim 29, wherein said process is finding at least one different user's location in said system and said locator object locates said at least one different user.

31. A method for communicating in a computer system including form-driven client computing devices according to claim 30, wherein said process includes pushing a message to said at least one different user after locating said at least one different user.

32. A method for communicating in a computer system including form-driven client computing devices according to claim 29, further comprising the step of:

securing and authenticating communications with said client device including the utilization of an encryption algorithm and authentication techniques.

33. A data communications system, comprising:

a plurality of microprocessor client devices having a form-driven operating system, a presentation manager, an input device and an output device, each said client device creating a data transaction using a form provided by said form-driven operating system;

a plurality of applications for carrying out tasks and for assisting in the generation of at least one of report, menu, form, message, list, voice, audio, video, graphic and other data;

a plurality of databases for the storage of at least one of report, menu, form, message, list, voice, audio, video, graphic and other data; and a plurality of server computers controlled by broad operations system server (BOSS) software stored in computer-readable media of said plurality of server computers, wherein said server computers receive data from and transmit data to at least one of a plurality of client devices, an application, a database, and another server computer;

wherein said BOSS software includes a locator object for retrieving at least one of an IP address number, a PSTN number, and other network identification information for use in identifying and locating at least one user and at least one client device in said system.

34. A client computer system as recited in claim 33, wherein said locator object is utilized in connection with identifying a location of a user and a client device, and data is pushed to the client device where said user has initiated a session with the system.

* * * * *